United States Patent
Hasegawa et al.

(10) Patent No.: US 11,934,001 B2
(45) Date of Patent: Mar. 19, 2024

(54) LIGHTING DEVICE HAVING A LIGHT GUIDE WITH PRISM ARRAY FORMED THEREON AND A PRISM SHEET AND WHITE LEDS

(71) Applicant: Japan Display Inc., Tokyo (JP)

(72) Inventors: Makoto Hasegawa, Tokyo (JP); Nobuyuki Suzuki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/954,371

(22) Filed: Sep. 28, 2022

(65) Prior Publication Data

US 2023/0015472 A1 Jan. 19, 2023

Related U.S. Application Data

(63) Continuation of application No. PCT/JP2021/003745, filed on Feb. 2, 2021.

(30) Foreign Application Priority Data

Apr. 3, 2020 (JP) ................. 2020-067326

(51) Int. Cl.
*F21V 8/00* (2006.01)
*G02F 1/139* (2006.01)

(52) U.S. Cl.
CPC ......... *G02B 6/0053* (2013.01); *G02B 6/0045* (2013.01); *G02B 6/0055* (2013.01); *G02B 6/0073* (2013.01); *G02F 1/139* (2013.01)

(58) Field of Classification Search
CPC ... G02B 6/0053; G02B 6/0038; G02B 5/0045
See application file for complete search history.

(56) References Cited

U.S. PATENT DOCUMENTS 11,314,128 B2 * 4/2022 Lee .................. G02F 1/133512
2008/0123350 A1 5/2008 Choe et al.
(Continued)

FOREIGN PATENT DOCUMENTS

CN 104246590 A 12/2014
JP 2013-4197 A 1/2013
(Continued)

OTHER PUBLICATIONS

Office Action dated May 12, 2023 in Chinese Patent Application No. 202180025560.0, 10 pages.
(Continued)

*Primary Examiner* — Robert J May
(74) *Attorney, Agent, or Firm* — XSENSUS LLP

(57) ABSTRACT

A lighting device including: a light guide, a reflecting sheet and a first prism sheet, in which a first white LED, a second white LED and a third white LED are disposed in a same interval on a first side surface and on a second side surface, which opposes to the first side surface, a first prism array extending in a first direction and arranged in a second direction is formed on the major surface, a second prism array extending in a second direction and arranged in a first direction is formed on the back surface, the reflecting sheet is disposed under the back surface of the light guide, the first prism sheet is disposed on the major surface of the light guide, and a third prism array, extending in the second direction and arranged in the first direction is formed on the back surface of the first prism sheet.

16 Claims, 36 Drawing Sheets

(56) References Cited

U.S. PATENT DOCUMENTS

| | | | |
|---|---|---|---|
| 2012/0127397 A1* | 5/2012 | Yamamoto | G02B 6/0065 |
| | | | 29/428 |
| 2012/0314451 A1 | 12/2012 | Matsuura | |
| 2015/0029442 A1 | 1/2015 | Koike et al. | |
| 2019/0025657 A1 | 1/2019 | Presniakov et al. | |

FOREIGN PATENT DOCUMENTS

| | | |
|---|---|---|
| KR | 10-2018-0028624 A | 3/2018 |
| WO | 2013/080903 A1 | 6/2013 |
| WO | 2013/094481 A1 | 6/2013 |
| WO | 2013/122155 A1 | 8/2013 |

OTHER PUBLICATIONS

Search Report dated May 12, 2023 in Chinese Patent Application No. 202180025560.0, 3 pages.

International Search Report and Written Opinion dated Apr. 13, 2021, received for PCT Application PCT/JP2021/003745, filed on Feb. 2, 2021, 9 pages including English Translation.

Office Action dated May 16, 2023 in Japanese Patent Application No. 2022-511591, 6 pages.

* cited by examiner

LIGHTING DEVICE HAVING A LIGHT GUIDE WITH PRISM ARRAY FORMED THEREON AND A PRISM SHEET AND WHITE LEDS

CROSS-REFERENCE TO RELATED APPLICATIONS

The present application is a continuation application of International Application No. PCT/JP2021/003745, filed on Feb. 2, 2021, which claims priority to Japanese Patent Application No. 2020-067326, filed on Apr. 3, 2020. The contents of these applications are incorporated herein by reference in their entirety.

BACKGROUND OF THE INVENTION

(1) Field of the Invention

The present invention relates to a lighting device of thin, small light distribution angle, and less power consumption.

(2) Description of the Related Art

Light emitting diodes (LEDs) are being used for the lighting device. Light emitting diodes have high luminous efficiency, and thus advantageous for low power consumption. The light emitting diode, however, is a point light source; it must be transformed to the surface light source if it is used as a lighting device.

Patent document 1 discloses a lighting device having a flat emitting surface, in which the light emitted from the LED, disposed on the side wall of the lighting device, is reflected at the reflective back surface having a certain angle to the flat emitting surface, and is mitted from the emitting surface.

Patent document 2 discloses a lighting device having a similar structure as patent document 1, in which the LED emitting neutral light and the LED emitting bulb light are juxtaposed on the side wall to attain a surface light source having a desired color temperature by lighting those LEDs simultaneously. Patent document 2 also discloses to change a color temperature of white light by lighting a part of those LEDs.

Patent document 3 discloses to use a liquid crystal lens to control the shape of the light beam.

PRIOR TECHNICAL DOCUMENT

Patent Document

Patent document 1: WO 2013-080903
Patent document 2: WO 2013-094481
Patent document 3: US 2019/0025657 A1

SUMMARY OF THE INVENTION

As to indoor lighting, white light is generally used. There are many white light of different color temperatures; for example, a neutral white (color temperature is approximately 5000 K), a warm white (color temperature is approximately 3500 K), bulb light white (color temperature is approximately 2800 K). The light source itself is replaced if a light of a different white color temperature is needed.

On the other hand, the lighting device needs to have a small light distribution angle when it is used as e.g. a spot light. Conventionally, for such a lighting device, a parabolic mirror has been used to form a parallel light. However, a certain depth is necessary in such a lighting device; therefore, it is difficult to attain a small lighting device or a thin lighting device.

The purpose of the present invention is to realize a lighting device of thin, having small light distribution angle, and further, being able to change a color temperature of emitting light easily.

The present invention solves the above explained problems; concrete structures are as follows.

(1) A lighting device including: a light guide, a reflecting sheet disposed under the light guide, and a first prism sheet disposed over the light guide; in which, a first white LED, a second white LED and a third white LED are disposed in a same interval on a first side surface and on a second side surface, which opposes to the first side surface; a first prism array extending in a orthogonal direction to the first side surface and arranged in a parallel direction with the first side surface is formed on a major surface of the light guide; a second prism array extending in a parallel direction with the first side surface and arranged in an orthogonal direction to the first side surface is formed on a back surface of the light guide; the reflecting sheet is disposed under the back surface of the light guide; the first prism sheet is disposed on the major surface of the light guide; and a third prism array, extending in a parallel direction with the first side surface of the first light guide and arranged in orthogonal direction to the side surface of the first light guide is formed on a first surface of the first prism sheet opposing to the light guide.

(2) A lighting device including: a light guide, a reflecting sheet disposed under the light guide, and a first prism sheet disposed over the light guide; in which, a first white LEDs are disposed in a same interval on a first side surface of the light guide, and a second white LEDs are disposed in a same interval on a second side surface, which opposes to the first side surface; a first prism array extending in a orthogonal direction to the first side surface and arranged in a parallel direction with the first side surface is formed on a major surface of the light guide; a second prism array extending in a parallel direction with the first side surface and arranged in a orthogonal direction to the first side surface is formed on a back surface of the light guide; the reflecting sheet is disposed under the back surface of the light guide; the first prism sheet is disposed on the major surface of the light guide; and a third prism array, extending in a parallel direction with the first side surface of the first light guide and arranged in orthogonal direction to the side surface of the first light guide is formed on a first surface of the first prism sheet opposing to the light guide.

(3) The lighting device according to (1) or (2), in which a plurality of liquid crystal lenses extending in a first direction and arranged in a second direction are disposed on the first prism sheet.

(4) The lighting device according to (3), in which a plurality of liquid crystal lenses extending in the second direction and arranged in the first direction are disposed above the first liquid crystal lens.

DETAILED DESCRIPTION OF THE PREFERRED EMBODIMENTS

Figure 1:
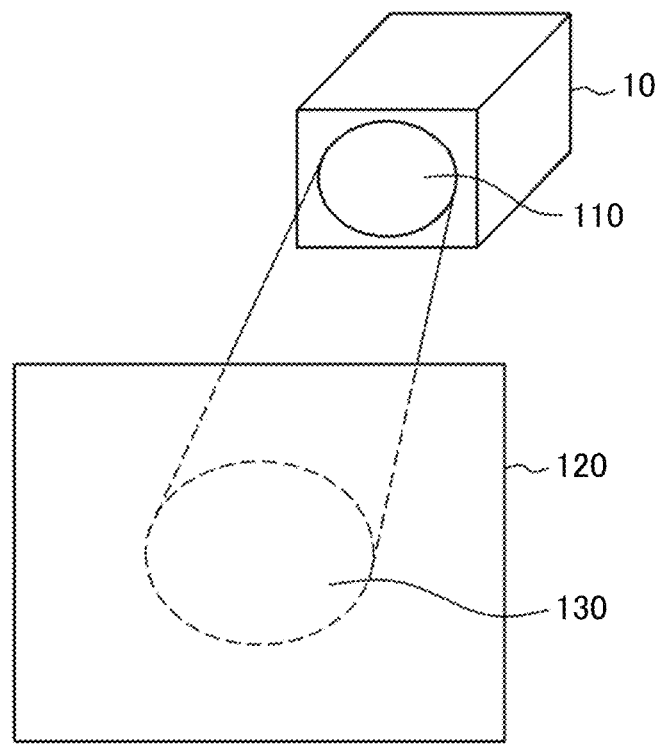
FIG. 1 is a perspective view of a lighting device.

FIG. 1 is an example of the lighting device 10, which is used for a spot light. The light from the lighting device 10 is collimated; a spot light 130 is emitted from the emitting surface 110, and applied to the incident surface 120. The light distribution angle is controlled as e.g. 12 degrees to acquire a spot light 130.

Figure 2:
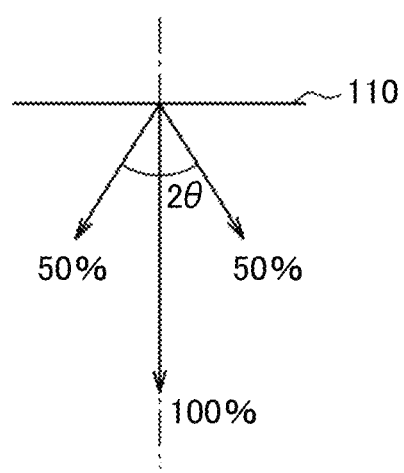
FIG. 2 is a definition of the light distribution angle.

FIG. 2 defines the light distribution angle. FIG. 2 shows e.g. that a spot light is applied to the floor from a light emitting surface 110 disposed on the ceiling. The light intensity is largest at the normal direction to the light emitting surface 110; the light intensity decreases according to the polar angle becoming larger. The light distribution angle is defined as 2θ provided the intensity along the normal direction is 100%, and the intensity along the polar angle θ is 50%. In normally collimated light, the light distribution angle is required as 12 degrees or less.

Figure 3:
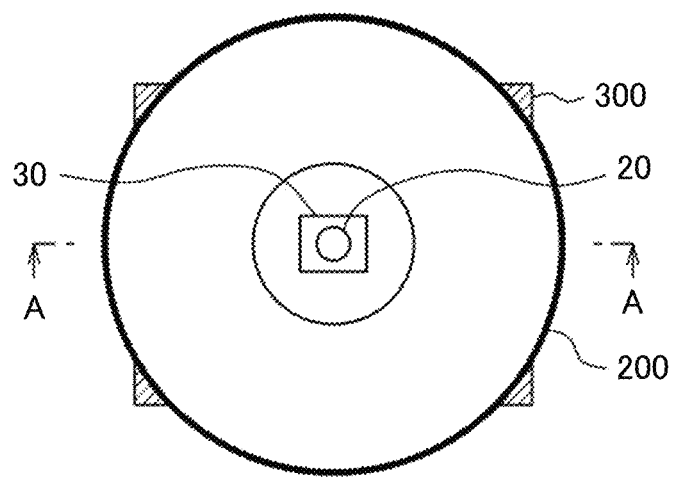
FIG. 3 is a plan view of the lighting device, which collimates light with a parabolic mirror.
Figure 4:
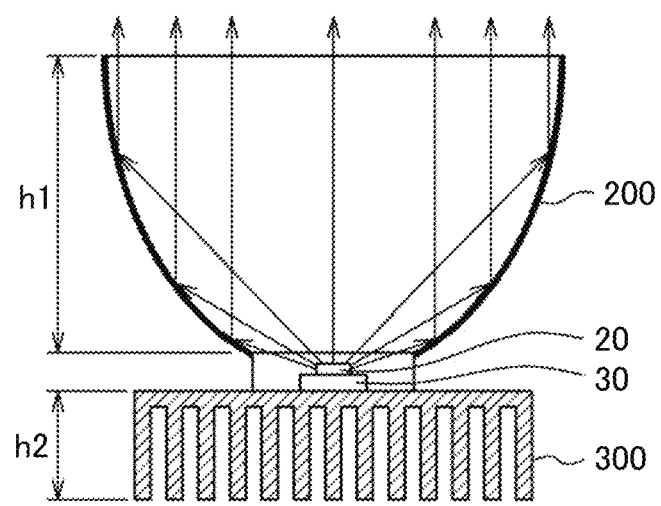
FIG. 4 is a cross sectional view of FIG. 3 along the line A-A.

Conventionally, a parabolic mirror 200 has been used to acquire such a collimated light. FIG. 3 is a plan view of the lighting device using the parabolic mirror 200; FIG. 4 is a cross sectional view of the lighting device of FIG. 3. In FIG. 3, the LED 20 is set at the center of the parabolic mirror 200. The LED 20 is set e.g. on the PCB substrate 30. The LED 20 is a high brightness LED, which becomes high temperature; thus, the LED 20 is set on the heat sink 300. A part of the heat sink 300, which is set at the rear of the parabolic mirror 200, is visible in FIG. 3.

FIG. 4 is a cross sectional view of FIG. 3 along the line A-A. In FIG. 4, the LED 20 is disposed at the bottom surface of the parabolic mirror 200. The lights emitted from the LED 20, except the light emitted in the optical axis direction, reflect at the parabolic mirror 200 and become parallel to the optical axis. The parabolic mirror 200, however, needs to be as high as h1 for enough collimating function. The height h1 of the parabolic mirror 200 needs to be about 60 mm to acquire the light distribution angle of about 12 degrees. Actually, since the height h2 of the heat sink 300 is added, the total height of the lighting device becomes 80 mm or more.

Generally white lighting is used for lighting. There are various color temperatures in white lighting; for example, a neutral white (color temperature is approximately 5000 K), a warm white (color temperature is approximately 3500 K), a bulb light white (color temperature is approximately 2800 K), etc. Sometimes a color temperature of white light is desired to be changed according to user's preference. When a lighting device uses a structure having the parabolic mirror as depicted in FIGS. 3 and 4, the entire lighting device must be replaced to meet that demand.

The purpose of the present invention is to realize a lighting device of thin, being able to emit a collimated light, and further being able to change a color temperature of emitting light easily. The present invention is explained by the following embodiments.

Embodiment 1

Figure 5:
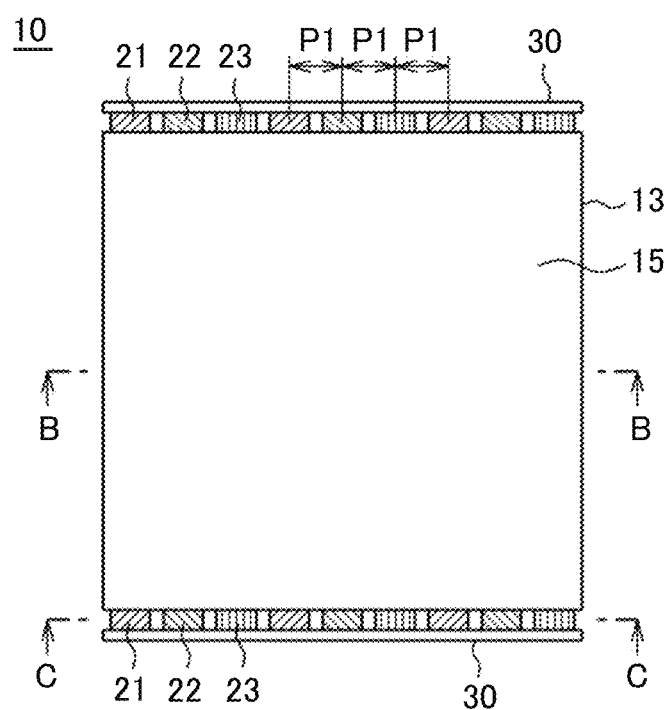
FIG. 5 is a plan view of the lighting device according to embodiment 1.
Figure 6:
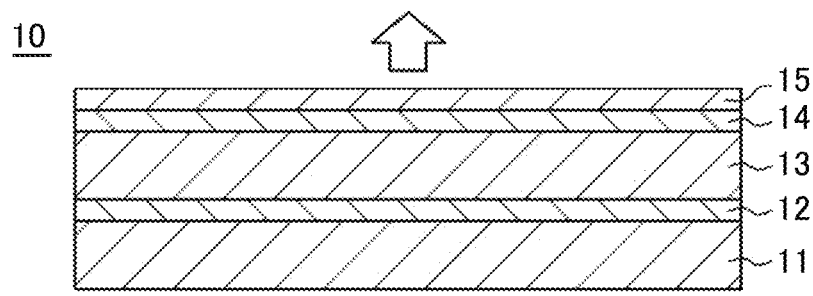
FIG. 6 is a cross sectional view of FIG. 5 along the line B-B.
Figure 7:
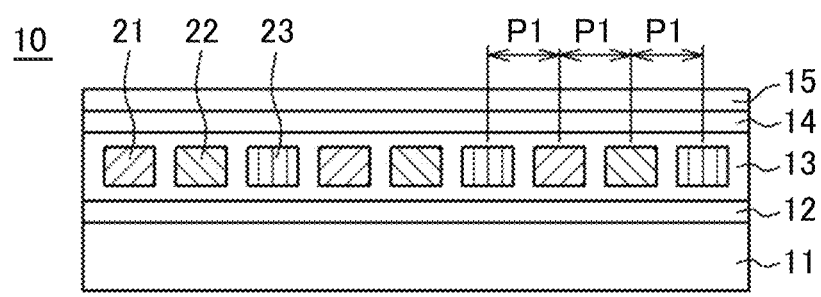
FIG. 7 is a cross sectional view of FIG. 5 along the line C-C.

FIG. 5 is a plan view of a lighting device 10 according to embodiment 1; FIG. 6 is a cross sectional view of FIG. 5 along the line B-B; FIG. 7 is a cross sectional view of FIG. 5 along the line C-C. In FIG. 5, LEDs 21 and 22 as light sources are disposed on a side surface of a light guide 13. A prism sheet 15 is disposed on the light guide 13 to make the light distribution angle of the emitting light smaller. In FIG. 6, LEDs 21, LEDs 22, and LEDs 23 are all white LEDs, however, color temperatures are different. The LED 21 emits light of a neutral white (color temperature is approximately 5000 K), the LED 22 emits light of a warm white (color temperature is approximately 3500 K), and the LED 23 emits light of a bulb light white (color temperature is approximately 2800 K).

The feature of FIG. 5 to dispose those LEDs 21, 22, 23 of different color temperature in a uniform pitch on side surfaces of the light guide 13. In the structure of FIG. 5, a desired color temperature can be acquired by switching to use one kind of LED among three kinds of LEDs. In the backlight of the display device, there is a system to get white light by lighting the LEDs of three colors, red, green and blue simultaneously; however, for this purpose, three LEDs of red, green and blue must be disposed as near as possible. In other words, in the back light of the display device, a distance between the LED sets of three colors, red, green and blue is much larger compared with a distance between each of the LEDs of red, green and blue in the LED set of three colors. The present invention is substantially different in this point from the conventional back light for the display device.

FIG. 6 is a cross sectional view of FIG. 5 along the line B-B. In FIG. 6, a reflection sheet 12 is disposed on a substrate 11, which constitutes a frame of the lighting device. A light guide 13 is disposed on the reflection sheet 12; a lower prism sheet 14 and an upper prism sheet 15 are disposed on the light guide 13 to decrease a light distribution angle. In the meantime, only one prism sheet may be used according to a lighting device.

FIG. 7 is a cross sectional view of FIG. 5 along the line C-C. In FIG. 7, the LEDs 21, 22, and 23 are disposed on a side surface of the light guide 13. As explained in FIG. 5, the white LEDs 21, 22, 23 of different color temperatures are disposed in a uniform interval on the side surface of the light guide 13. Other structures of FIG. 7 is the same as explained in FIG. 6.

Figure 8:
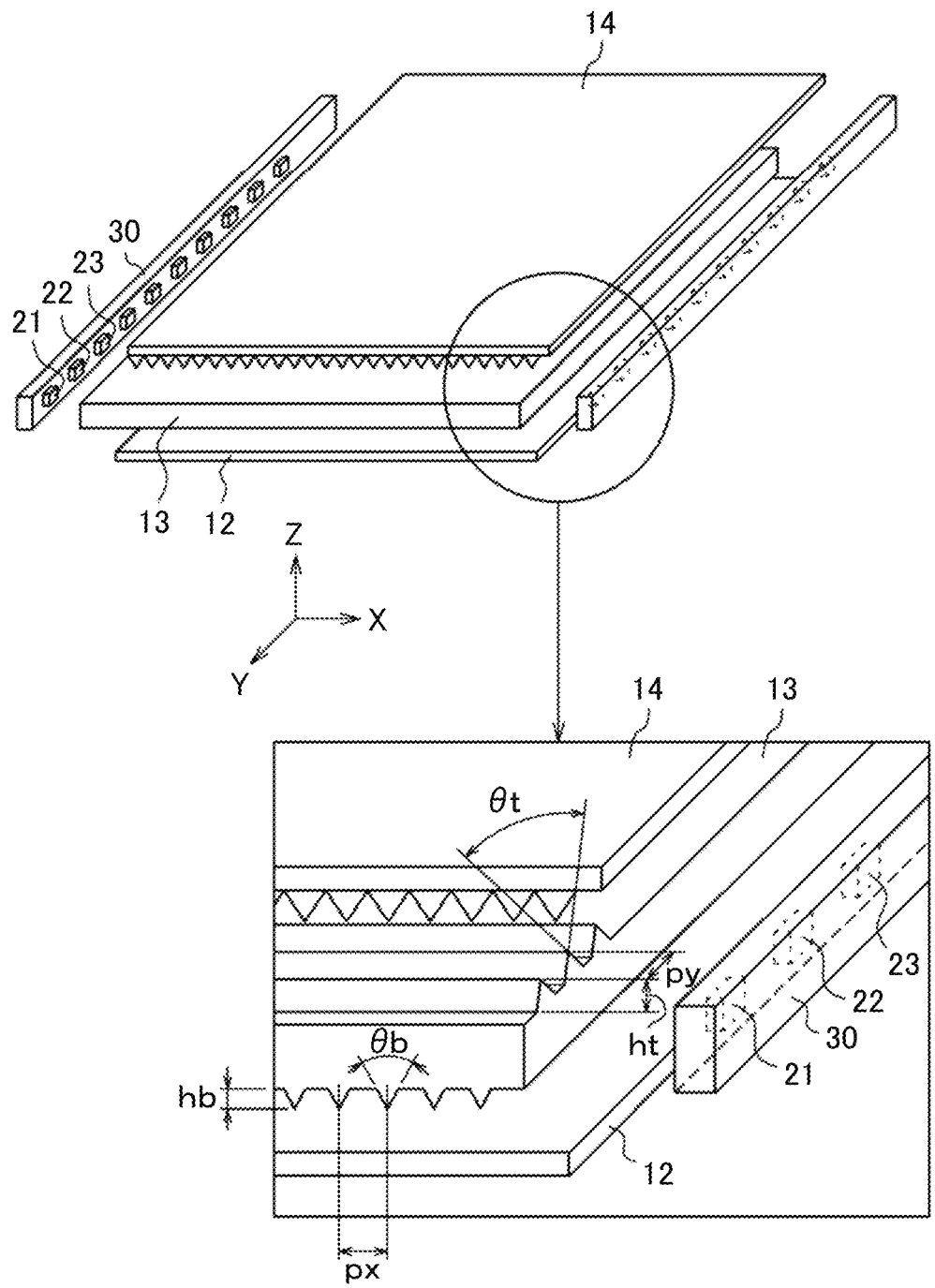
FIG. 8 is a perspective view of the lighting device according to embodiment 1.

FIG. 8 is a perspective view of the lighting device shown in FIG. 5. In FIG. 8, however, an upper prism sheet is omitted to avoid complexity of the drawing. In FIG. 8, the LEDs 21, 22, and 23 are disposed in a same interval on the two side surfaces of the light guide 13. The reflection sheet 12 is disposed under the light guide 13. The reflection sheet 12 reflects the light going down from the light guide 13 to upper direction, namely, to the emitting surface. ESR (Enhanced Specular Reflector) of 3M company can be used for the reflection sheet 12; a thickness of the reflection sheet 12 is e.g. approximately 70 μm.

In FIG. 8, the light guide 13 is disposed on the reflection sheet 12. A thickness of the light guide 13 is approximately 2 mm. The light guide 13 has a role to direct the light entered from the LEDs 21, 22 and 23 through the side surface of the light guide 13 to upper direction, namely the direction to the emitting surface. The light which goes down is reflected by the reflection sheet 12 to upper direction, i.e. the emitting surface.

Prism arrays are formed on the upper surface and the lower surface of the light guide 13 to direct the light entered through the side surfaces to emit from the emitting surface to form a surface light source. The prism arrays formed on the upper surface and the lower surface of the light guide 13 are very different from the prism arrays formed on the lower prism sheet 14 and the upper prism sheet 15; the prism arrays formed on the upper surface and the lower surface of the light guide 13 are also very different from the prism arrays formed on the light guide which is used for the display device. The projections (or grooves) and the pitches of the prism arrays formed on the light guide 13 are extremely smaller compared with the projections (or grooves) and the pitches of the prism arrays formed on the prism sheet 14 and so forth. In the meantime, since FIG. 8 is a model, the above explained differences in dimensions of the prism arrays are not reflected.

In FIG. 8, the prism array formed on the bottom surface of the light guide 13 extends in y direction and is arranged in x direction. A height hb of the projection of the prism array is e.g. 0.002 μm, a pitch px is e.g. 0.1 μm. An apex angle θb of the prism is e.g. 90 degrees. The prism array formed on the top surface of the light guide 13 extends in x direction and is arranged in y direction. A height ht of the projection of the prism array is e.g. 0.1 μm, a pitch py is e.g. 0.2 μm. An apex angle θt of the prism is e.g. 90 degrees. As described above, the height and the pitch of the prism array formed on the top surface of the light guide 13 are larger than the height and the pitch of the prism array formed on the bottom surface of the light guide 13. By the way, the prism arrays formed on the top surface and the bottom surface of the light guide 13 can be formed by forming V grooves instead of forming projections.

The lower prism sheet 14 is disposed on the light guide 13. The lower prism sheet 14 is a so called reverse prism sheet in which the prism array is formed on the bottom surface. In FIG. 8, the prism array whose cross section is triangle extends in y direction and is arranged in x direction by pitch px. That is to say, the extending direction of the prism array of the lower prism sheet 14 is perpendicular to the extending direction of the prism array formed on the top surface of the light guide 13, and is in a same direction as the prism array formed on the bottom surface of the light guide 13.

Figure 9:
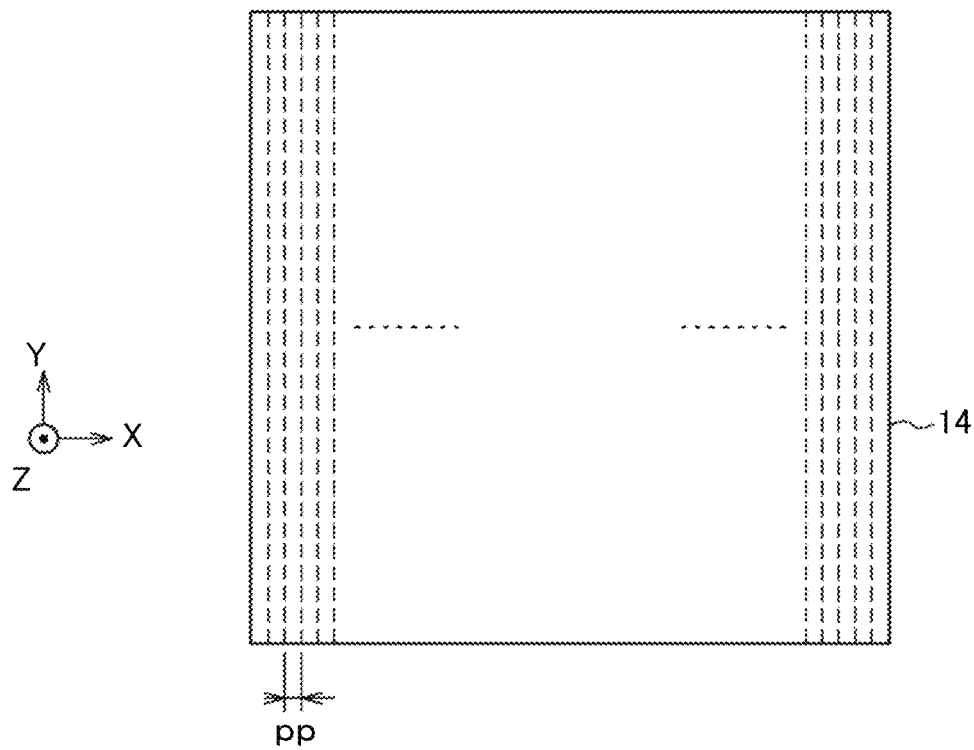
FIG. 9 is a plan view and cross sectional views of the lower prism sheet.
Figure 9:
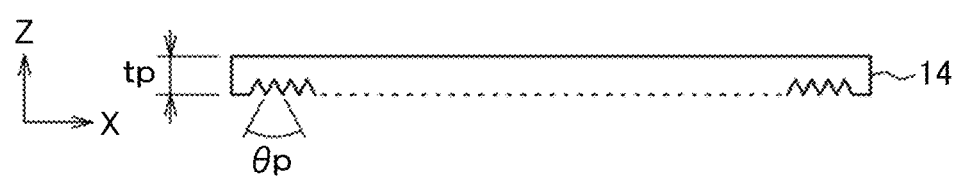
Figure 9:
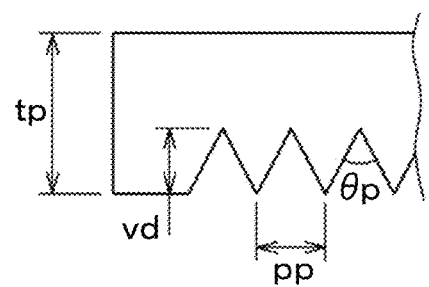

FIG. 9 is the structure of the lower prism sheet 14 when the prism array is formed by V grooves. In FIG. 9, the prism array extends in y direction and is arranged in x direction. In FIG. 9, a thickness tp of the lower prism sheet 14 is e.g. 125 μm; a depth of the V groove is e.g. 75 μm; an apex angle θp is e.g. 66 degrees; a pitch pp is e.g. 100 μm. The lower prism sheet 14 of FIG. 9 directs the light, which tends to diverge in x direction, into a normal direction of the light emitting surface, namely, in z direction.

Figure 10:
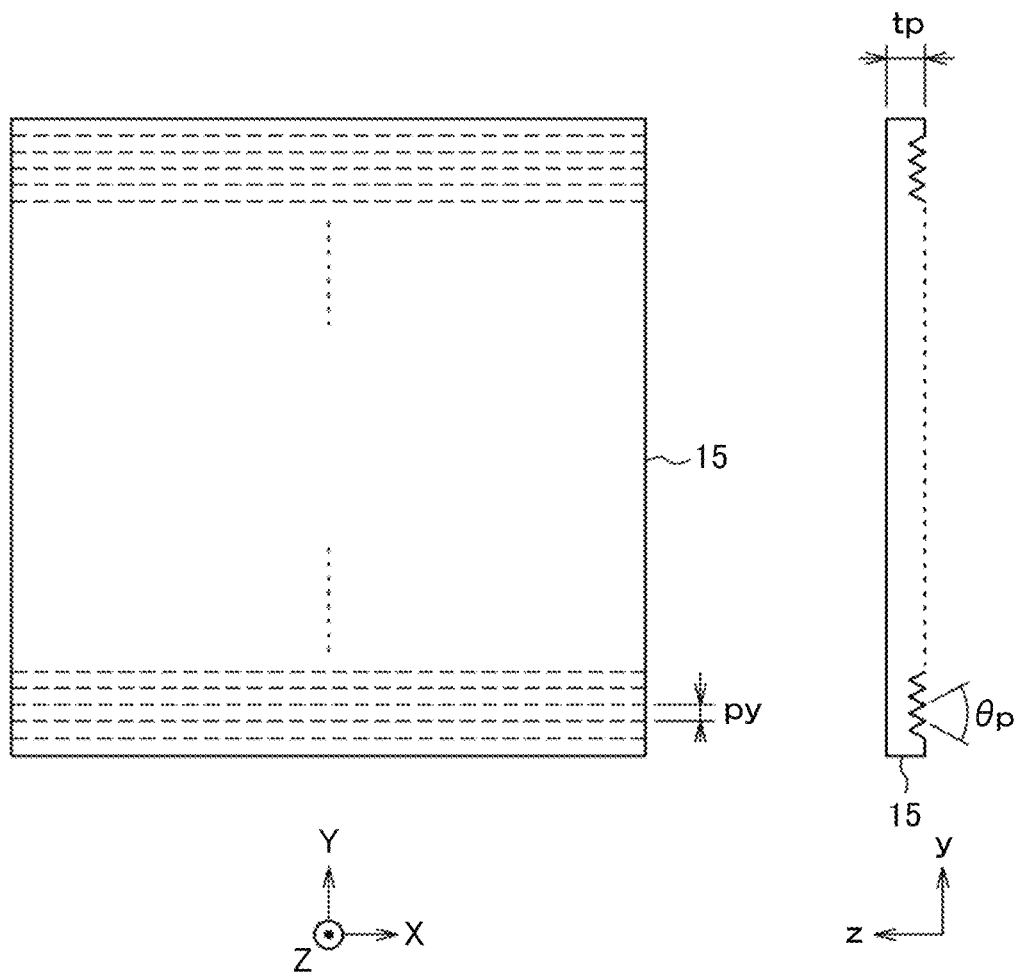
FIG. 10 is a plan view and cross sectional views of the upper prism sheet.

FIG. 10 is the structure of the upper prism sheet 15, which is disposed on the lower prism sheet 14. In the meantime, the upper prism sheet 15 is omitted in FIG. 8. The prism array of the upper prism sheet 15 extends in x direction and is arranged in y direction. The upper prism sheet 15 is also a reverse prism sheet as the lower prism sheet 14; a thickness tp of the upper prism sheet is e.g. 125 µm; a depth of the V groove is e.g. 75 µm; an apex angle θp is e.g. 66 degrees; a pitch pp is e.g. 100 µm. The upper prism sheet 145 directs the light, which tends to diverge in y direction, into a normal direction of the light emitting surface, namely, in z direction.

As described above, the height (or the depth of V groove) and the pitch of the prism arrays formed on the top surface and the bottom surface of the light guide 13 are much smaller, in two digits order or less or sometimes, three digits order or less, compared with the height (or the depth of V groove) and the pitches of the prism arrays of the lower prism sheet 14 and the upper prism sheet 15. The lighting device having high utilizing efficiency of light and low light distribution angle can be realized by combining the light guide 13, the lower prism sheet 14 and the upper sheet 15 explained above.

Figure 11:
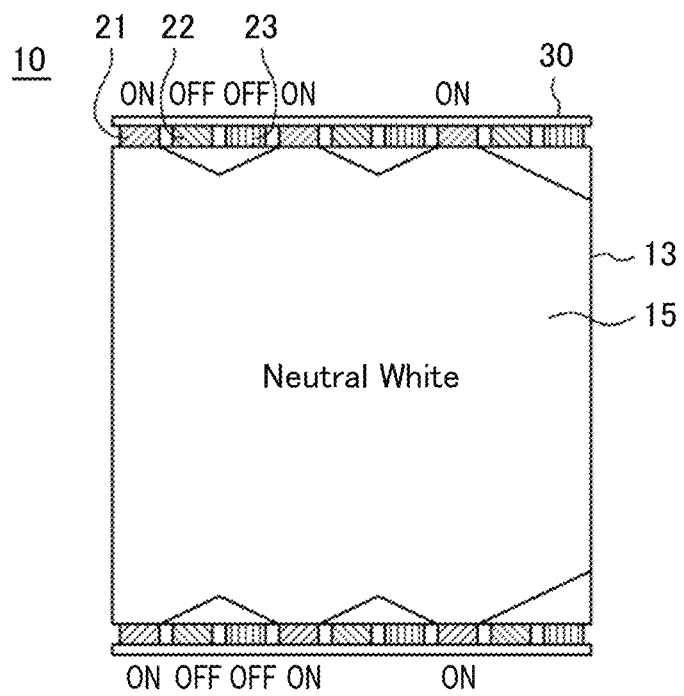
FIG. 11 is a plan view of first example of embodiment 1.

FIG. 11 is a plan view of a first example according to embodiment 1 shown by FIG. 5. In FIG. 11, only the LEDs 21 of neutral white are lit on among the white three LEDs 21, 22 and 23 disposed on the side surface of the light guide 13; therefore, neutral white light is emitted from the emitting surface, namely, the upper prism sheet 15, in this case.

Figure 12:
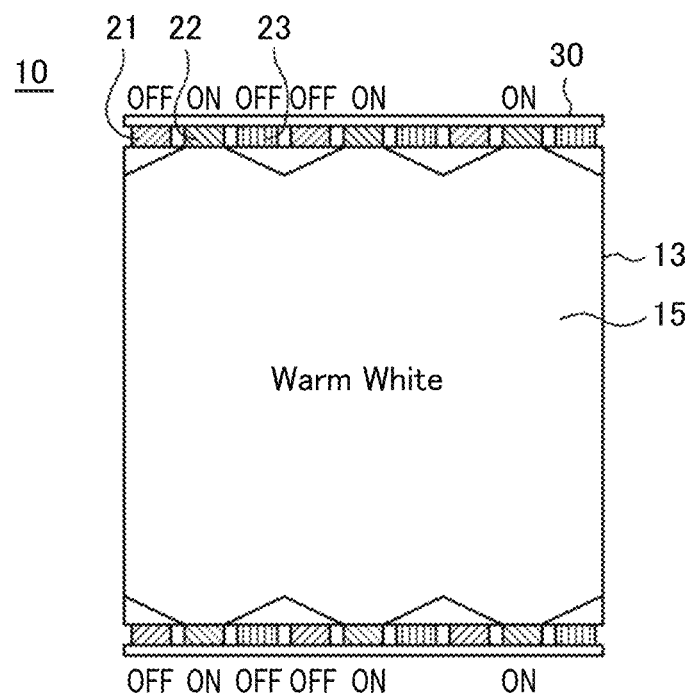
FIG. 12 is a plan view of second example of embodiment 1.

FIG. 12 is a plan view of a second example according to embodiment 1 shown by FIG. 5. In FIG. 12, only the LEDs 22 of warm white are lit on among the white three LEDs 21, 22 and 23 disposed on the side surface of the light guide 13; therefore, warm white light is emitted from the emitting surface, namely, the upper prism sheet 15, in this case.

Figure 13:
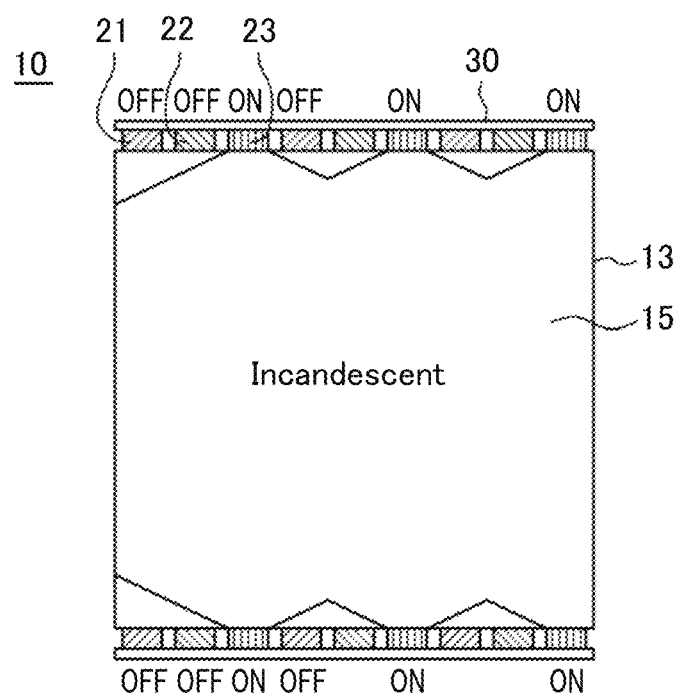
FIG. 13 is a plan view of third example of embodiment 1.

FIG. 13 is a plan view of a third example according to embodiment 1 shown by FIG. 5. In FIG. 13, only the LEDs 23 of bulb light white are lit on among the white three LEDs 21, 22 and 23 disposed on the side surface of the light guide 13; therefore, bulb light white is emitted from the emitting surface, namely, the upper prism sheet 15, in this case.

Figure 14:
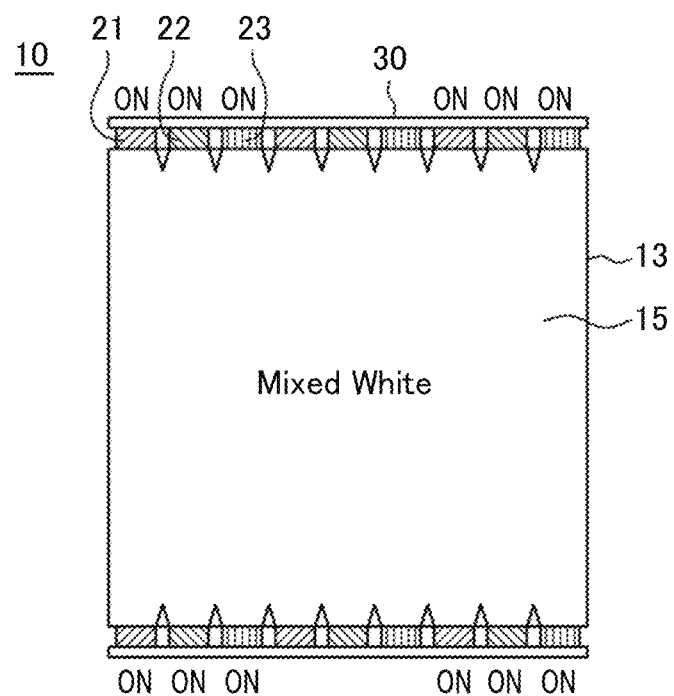
FIG. 14 is a plan view of fourth example of embodiment 1.

FIG. 14 is a plan view of a fourth example according to embodiment 1 shown by FIG. 5. In FIG. 14, all the three kinds of LEDs 21, 22 and 23 disposed on the side surface of the light guide 13 are lit on; therefore, a mixture white of neutral white, warm white and bulb white is emitted.

In the meantime, mixture white is not limited to the structure of FIG. 14; namely, a combination of two white colors can be possible among the three white light. As described above, white light of different color temperatures can be used only by one remoting switch.

Embodiment 2

Figure 15:
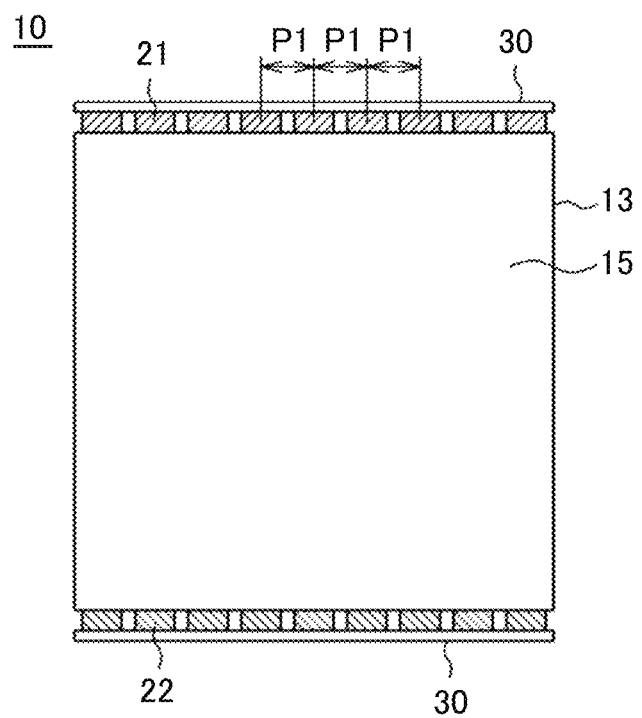
FIG. 15 is a plan view of the lighting device according to embodiment 2.

FIG. 15 is a plan view of a lighting device 10 according to embodiment 2. A cross sectional view of FIG. 15 is the same as FIG. 6. FIG. 15 differs from FIG. 5 of embodiment 1 in that the LEDs disposed on one side of the light guide 13 emit the same white color. For example, in FIG. 15, only the LEDs 21 of neural white are disposed on one side surface of the light guide 13; and only LEDs 22 of warm white are disposed on the other side surface opposing to the one side surface of the light guide 13. All the LEDs are disposed in a same pitch p1 as the same in embodiment 1.

Figure 16:
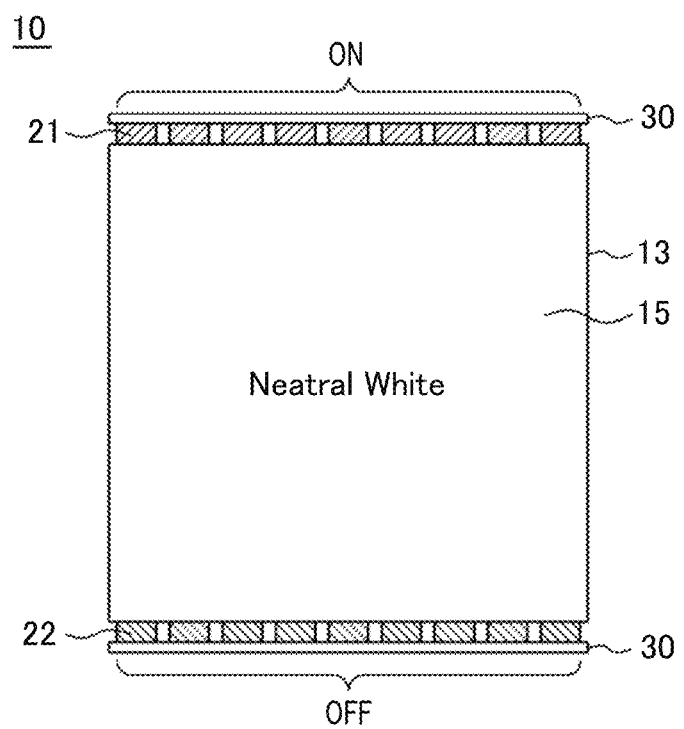
FIG. 16 is a plan view of first example of embodiment 2.

FIG. 16 is a plan view of a first example according to embodiment 2. In FIG. 16, only the LEDs 21 of neutral white disposed on a side surface of the one side of the light guide 13 are lit on; therefore, neutral white light is emitted from the emitting surface, namely, the upper prism sheet 15, in this case. In the structure of FIG. 16, more LEDs 21 of neutral color can be lit on than that of the example 1 of the embodiment 1, therefore, brighter light source can be acquired.

Figure 17:
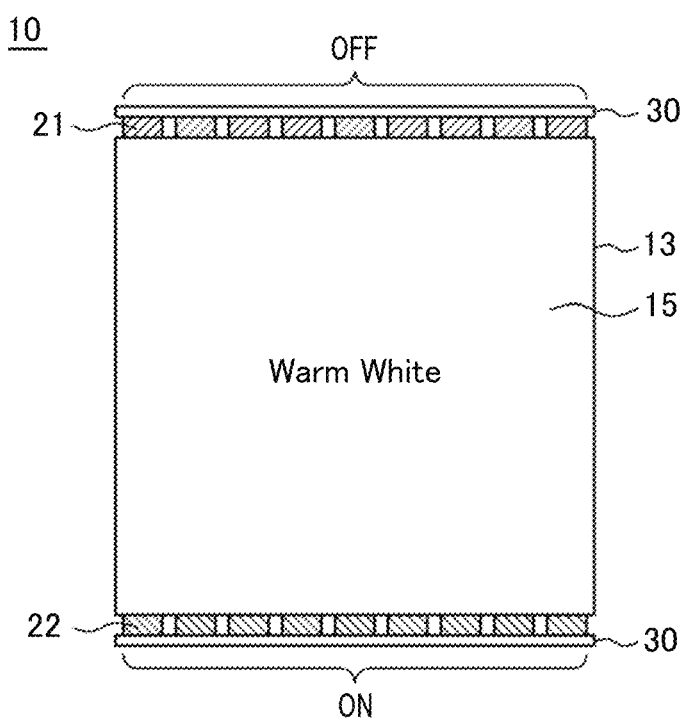
FIG. 17 is a plan view of second example of embodiment 2.

FIG. 17 is a plan view of a second example according to embodiment 2. In FIG. 17, only the LEDs 22 of warm white disposed on a side surface of the one side of the light guide 13 are lit on; therefore, warm white light is emitted from the emitting surface, namely, the upper prism sheet 15, in this case. In the structure of FIG. 17, more LEDs 22 of neutral color can be lit on than that of the example 2 of the embodiment 1, therefore, brighter light source can be acquired.

Figure 18:
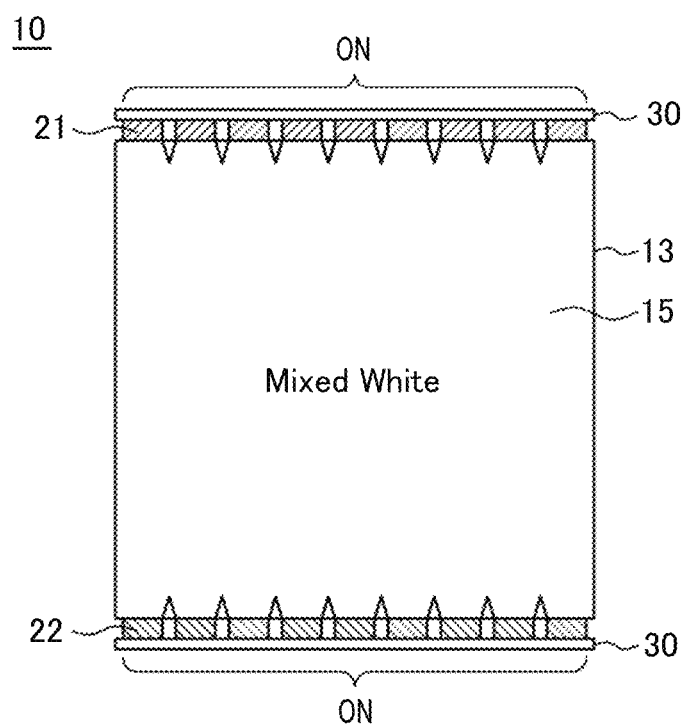
FIG. 18 is a plan view of third example of embodiment 2.

FIG. 18 is a plan view of a third example according to embodiment 2. In FIG. 18, both the LEDs 21 of neutral white disposed on a side surface of the one side of the light guide 13 and the LEDs 22 of warm white disposed on a side surface of the other side of the light guide 13 are lit on; therefore, mixture light of neutral white and warm white is emitted from the emitting surface, namely, the upper prism sheet 15, in this case. The case of FIGS. 15 to 18 is an example in which the LEDs 21 of neutral white and the LEDs 22 of warm white are combined, however, either one of LEDs can be replaced by other white LED, for example, the LEDs 23 of bulb light white.

Embodiment 3

Figure 19:
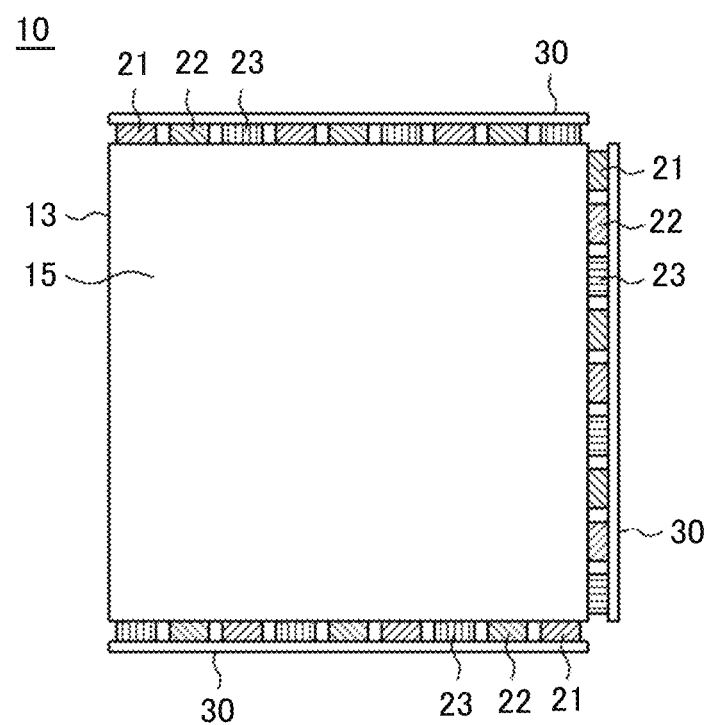
FIG. 19 is a plan view of first example of embodiment 3.

Embodiment 3 is an example in which the LEDs 21, 22, and 23 of different white color are disposed on three sides of the light guide 13. FIG. 19 is a plan view of a first example according to embodiment 3. In FIG. 19, the neutral white LEDs 21, the warm while LEDs 22 and the light bulb white LEDs 23 are disposed on each of the side surfaces of the light guide 13 in a same pitch. White light of necessary color temperature can be used by lighting on either of LEDs.

Figure 20:
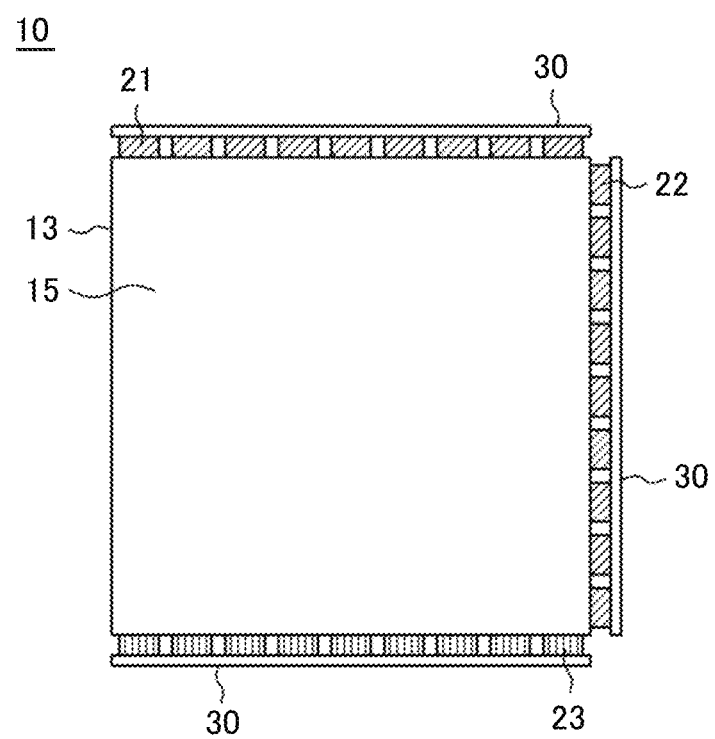
FIG. 20 a plan view of second example of embodiment 3.

FIG. 20 is a plan view of a second example according to embodiment 3. In FIG. 20, either one of the neutral white LEDs 21, the warm while LEDs 22 and the light bulb white LEDs 23 are disposed on one of the side surfaces of the light guide 13. White light of necessary color temperature can be acquired by lighting on the LEDs disposed on one side of the light guide 13.

Necessary color temperature of white light can be acquired by lighting different kinds of LEDs. The structure of embodiment 3 enables to form a brighter lighting device than the ones of embodiment 1 and embodiment 2.

Embodiment 4

Figure 21:
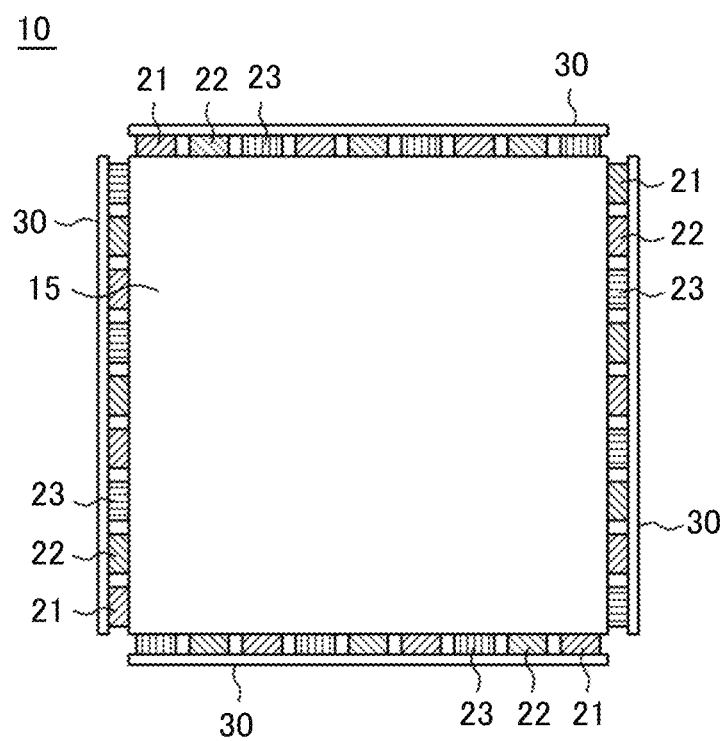
FIG. 21 is a plan view of first example of embodiment 4.

Embodiment 4 is an example in which LEDs 21, 22, and 23 of different white colors are disposed on four sides of the light guide 13. FIG. 21 is a plan view of a first example according to embodiment 4. In FIG. 21, the neutral white LEDs 21, the warm while LEDs 22 and the light bulb white LEDs 23 are disposed on each of the side surfaces of the light guide 13 in a same pitch. White light of necessary color temperature can be acquired by lighting either one of LEDs. A brighter lighting device can be acquired according to embodiment 4 than the ones according to embodiments 1 through 3.

Figure 22:
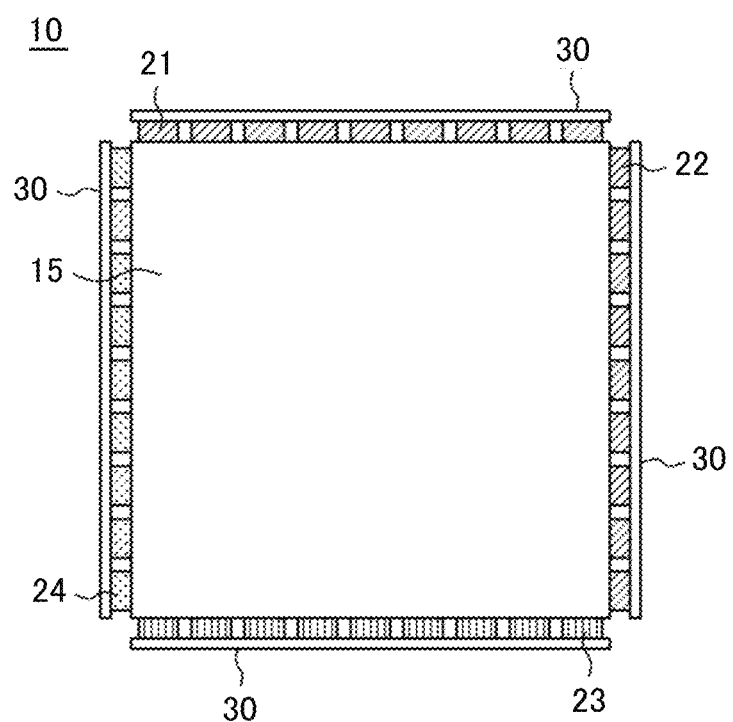
FIG. 22 a plan view of second example of embodiment 4.

FIG. 22 is a plan view of a second example according to embodiment 4. In FIG. 22, either one of the neutral white LEDs 21, the warm while LEDs 22, the light bulb white LEDs 23, and the LEDs 24 of different color temperature are disposed on one of the side surfaces of the light guide 13. White light of necessary color temperature can be acquired by lighting of LEDs on either side of the light guide 13. It is the same as embodiment 3 that a plurality of white light can be acquired by lighting different kinds of LEDs according to necessity.

Embodiment 5

Figure 23A:
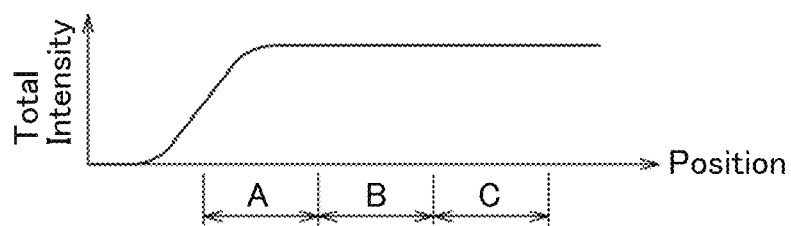
FIG. 23A is an example of light distribution when a liquid crystal lens is used.
Figure 23B:
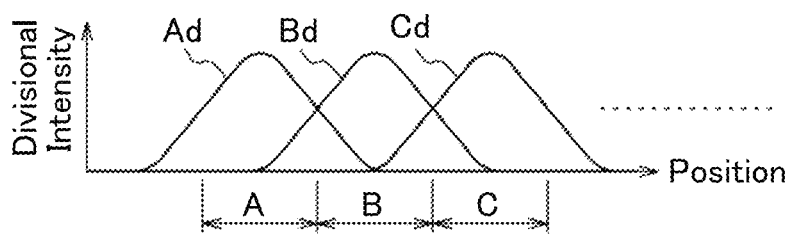
FIG. 23B is an example of light distribution according to a divided light source when the light source is divided and the liquid crystal lens is disposed on the divided light source.
Figure 23C:
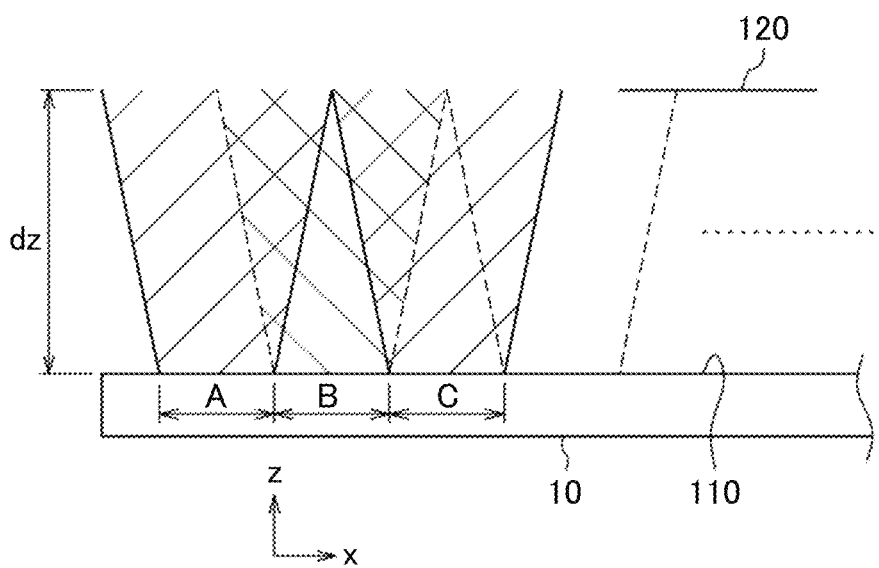
FIG. 23C is a cross sectional view when the light source is divided into a plural regions to show a function of the liquid crystal lens according to the present invention.

Embodiment 5 relates to the structure to control the outgoing light by setting liquid crystal lens at the emitting surface of the lighting device 10. FIGS. 23A through 23C are conceptual view relating to a function of the liquid crystal lens. FIG. 23C is a cross sectional view of the lighting device 10. In FIG. 23C, the emitting surface 110 is divided into the regions of A, B, C and so forth. The light having a predetermined light distribution angle is emitted from each of the regions.

FIG. 23B shows an example of illuminance at a distance dz from the emitting surface 110 in FIG. 23C. The vertical axis is an illuminance from each of areas A, B, C, and the like; Ad, Bd, Cd, and so forth are distribution of illuminance, which resembles to a normal distribution. FIG. 23A is a summation of illuminance from each of the areas depicted in FIG. 23B. The vertical axis in FIG. 23A is a summation of illuminance at the irradiated surface 120 from each of the areas at the emitting surface area 110. FIG. 23A shows the total illuminance distribution at the irradiated surface 120, a distance dz away from the emitting surface 110, is trapezoidal.

Embodiment 5 is a structure to set a liquid crystal lens at the emitting surface 110 to control the illuminance distribution at the irradiated surface 120; in other words, to change the illuminance distribution Ad, Bd, Cd, and so forth at the irradiated plane 120, a distance dz away from the emitting surface 110, by changing emitting light distribution at the regions A, B, C and so forth at the emitting surface 110 in FIG. 23B.

Figure 24:
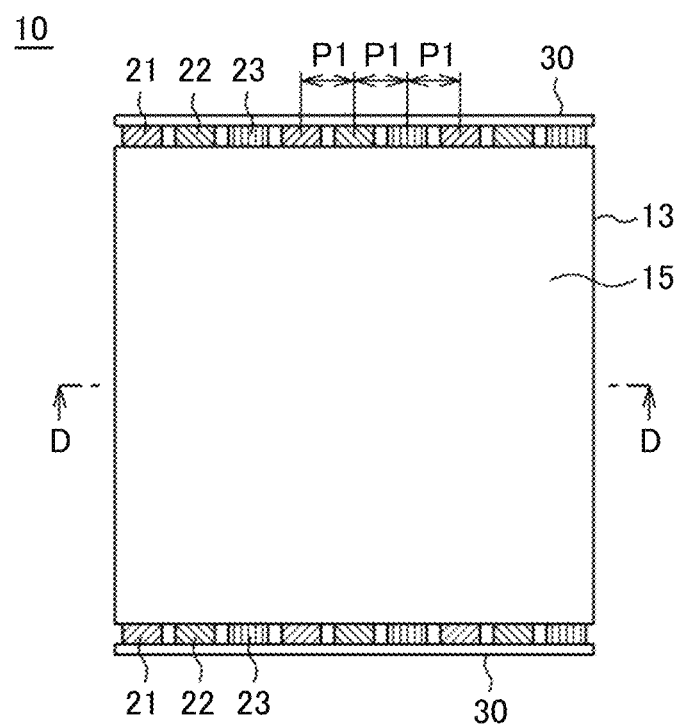
FIG. 24 is a plan view of the lighting device according to embodiment 5.
Figure 25:
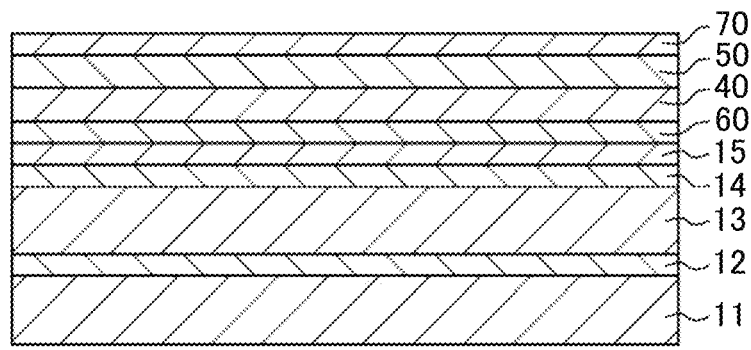
FIG. 25 is a cross sectional view of FIG. 24 along the line D-D.

FIG. 24, is a plan view of the lighting device 10 according to embodiment 2. FIG. 24 is the same as FIG. 5 of embodiment 1 except an upper polarizing plate 70 for the liquid crystal lens is set at the upper most surface in FIG. 24. FIG. 25 is a cross sectional view of FIG. 24 along the line D-D. In FIG. 25, the structures from the frame 11 to prism sheet 15 are the same as FIG. 6. In FIG. 25, a lower polarizing plate 60 is set on the upper prism sheet 15; the lower liquid crystal lens 40 is set on the lower polarizing plate 60; an upper liquid crystal lens 50 is set on the lower liquid crystal lens 40; and the upper polarizing plate 70 is set on the upper liquid crystal lens 50.

Figure 26:
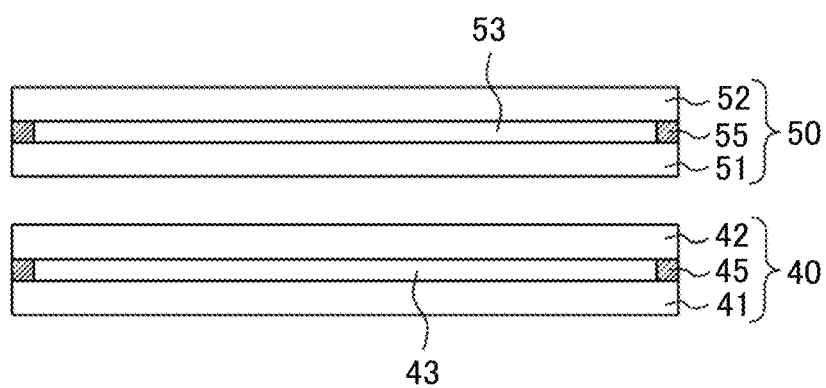
FIG. 26 is a cross sectional view of a first liquid crystal lens and a second liquid crystal lens.

FIG. 26 is a cross sectional view of the lower liquid crystal lens 40 and the upper liquid crystal lens 50. In the lower liquid crystal lens 40, a first substrate 41 and a second substrate 42 are adhered to each other at the periphery through a seal material 45; a liquid crystal 43 is sealed thereinside. In the upper liquid crystal lens 50, the third substrate 51 and the fourth substrate 52 are adhered to each other at the periphery through a seal material 55; a liquid crystal 53 is sealed thereinside.

Figure 27A:
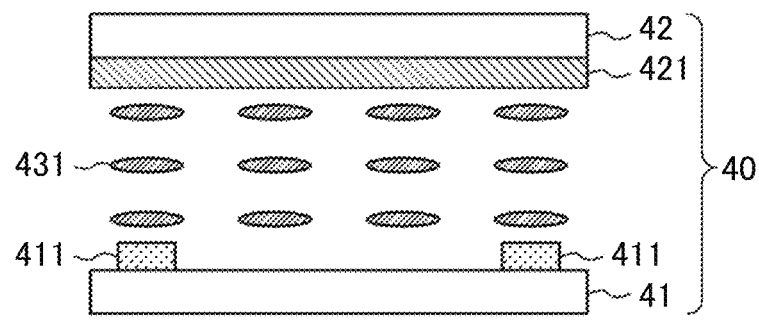
FIG. 27A is a cross sectional view in which lens action of the liquid crystal lens is shown.
Figure 27B:
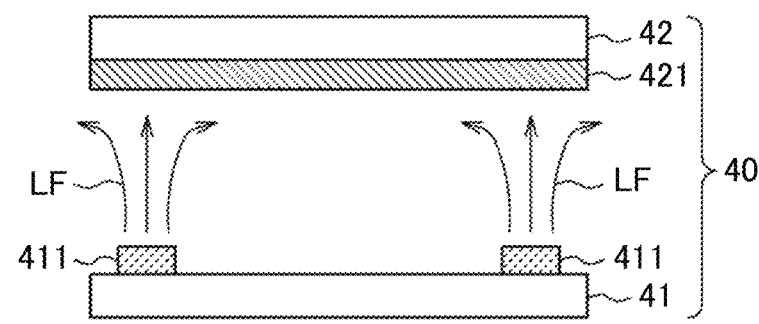
FIG. 27B is another cross sectional view in which lens action of the liquid crystal lens is shown.
Figure 27C:
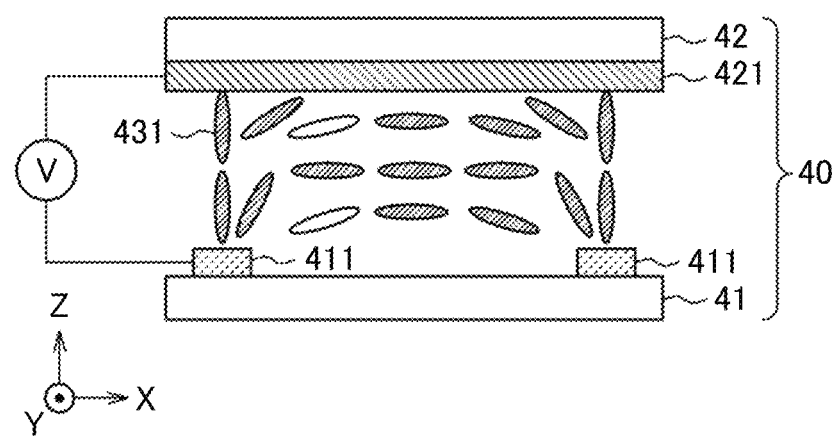
FIG. 27C is yet another cross sectional view in which lens action of the liquid crystal lens is shown.

FIGS. 27A through 27C are cross sectional views to explain function of the liquid crystal lens. FIG. 27A through FIG. 27C are explained for the lower liquid crystal lens 40; however, the function is the same for the upper liquid crystal lens 50. In FIG. 27A, a comb shaped electrode 411 is formed on the first substrate 41 and a plane electrode 421 is formed on the second substrate 42. Liquid crystal molecules 431 are arranged parallel to the substrate if field is not applied between the electrodes.

FIG. 27B is an example of lines of forces LF when a voltage is applied between the comb shaped electrode 411 of the first substrate 41 and the plane electrode 421 of the second substrate 42. FIG. 27C is a cross sectional view which shows alignment of the liquid crystal molecules 431 when a voltage is applied between the first electrode 411 and the plane electrode 421. In FIG. 26C, the liquid crystal molecules 431 align along the lines of forces LF; consequently, the distribution in refraction is generated, thus, liquid crystal lens is formed. Such a lens is referred to as the distributed refractive index type lens GRIN (Gradient Index Lens).

Figure 28:
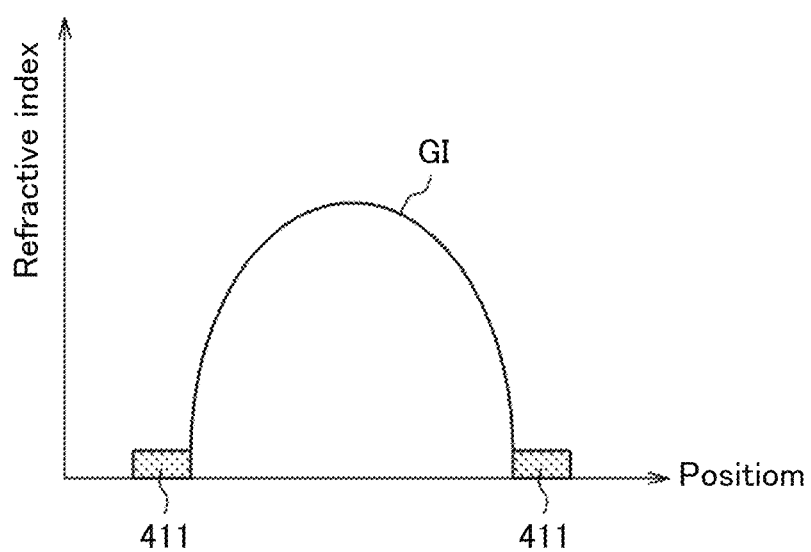
FIG. 28 is a graph to show a lens action of the liquid crystal lens.

FIG. 28 is an example of the distributed refractive index type lens. The vertical axis of FIG. 28 is refractive index. The refractive index is minimum on the first electrode 411, which is a comb electrode; the refractive index is maximum at the intermediate position between the comb electrodes. FIG. 28 shows a normal quadratic curve; however, the distribution of the refractive index can be drastically changed by a voltage between the first electrode 411 and the second electrode 412, a distance between the comb electrodes of the first electrode 411, a thickness of the liquid crystal layer 43, and so forth. Such function is the same in the upper liquid crystal lens 50. However, the directions of the lens action are perpendicular between in the lower liquid crystal lens 40 and in the upper liquid crystal lens 50.

Figure 29A:
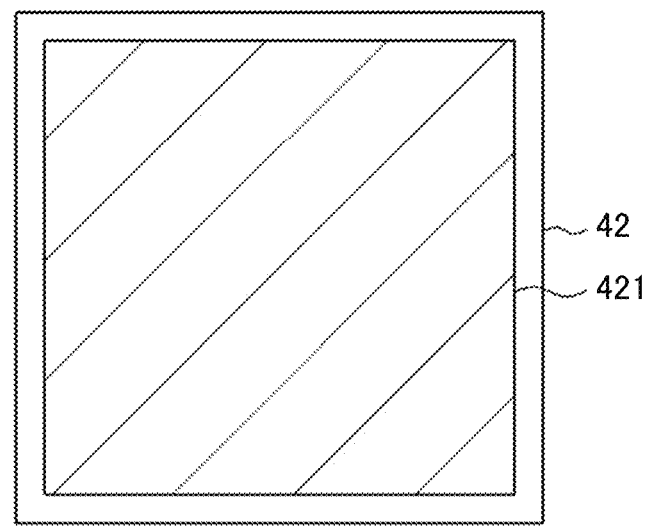
FIG. 29A is a plan view of a second electrode of the first liquid crystal lens.
Figure 29B:
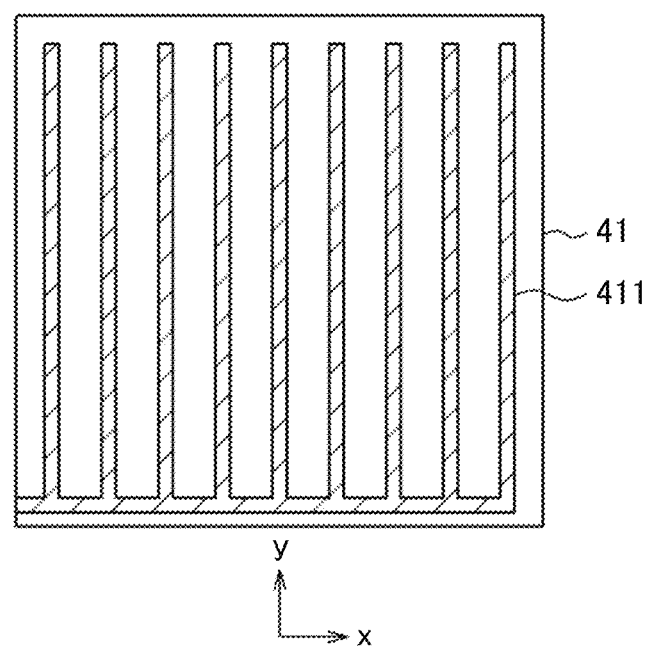
FIG. 29B is a plan view of a first electrode of the first liquid crystal lens.
Figure 30:
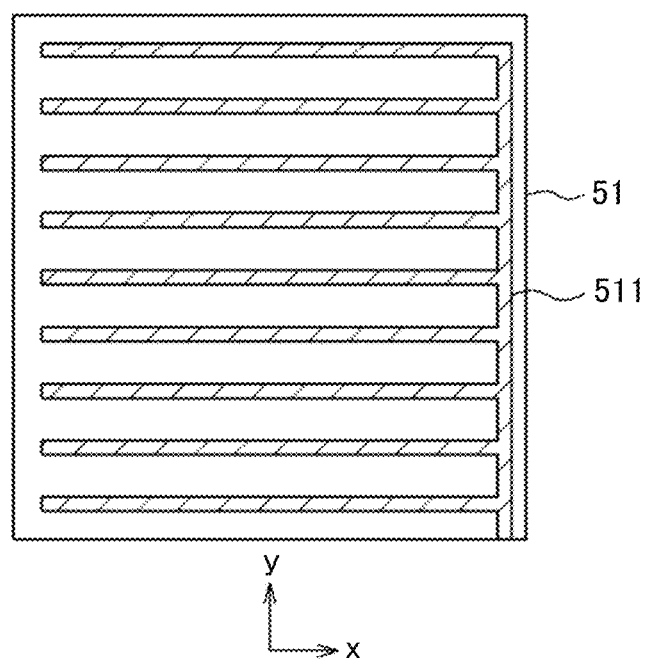
FIG. 30 is a plan view of a third electrode of the second liquid crystal lens.

FIG. 29A is a plan view of the second electrode 421, which is a planar electrode, formed on the second substrate 42 of the first liquid crystal lens 40. FIG. 29B is a plan view of the first electrode 411, which is a comb shaped electrode, formed on the first substrate 41 of the first liquid crystal lens 40. Both the first electrode 411 and the second electrode 421 are made of a transparent conductive film formed from e.g., ITO (Indium Tin Oxide). In FIG. 29B, the comb shaped electrodes extend in y direction and are arranged in x direction. FIG. 30 is a plan view of a third electrode 511, formed on the third substrate 51 of the second liquid crystal lens 50. The fourth electrode formed on the fourth substrate 52 is in a same shape as FIG. 29A. The comb shaped electrodes of the third electrode 511 extend in orthogonal direction to the first electrode 411, namely, extend in x direction and are arranged in y direction.

Figure 31:
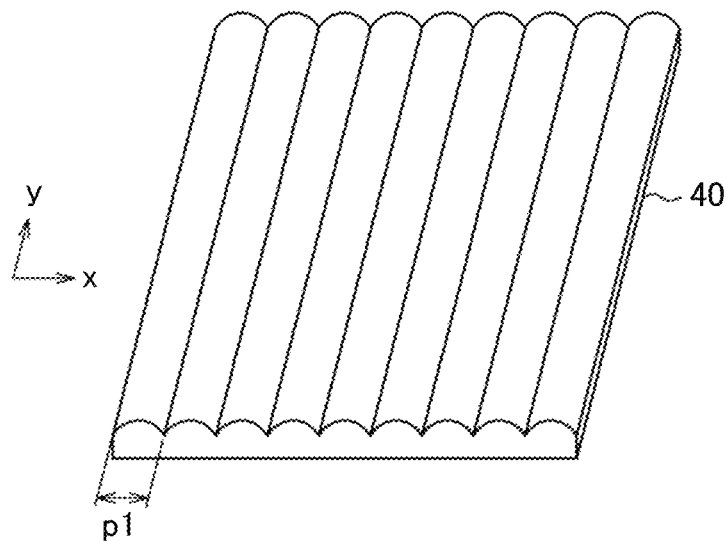
FIG. 31 is a model to show a lens action of the first liquid crystal lens.

FIG. 31 is a model of the lower liquid crystal lens 40 which is formed by the above structure. In FIG. 31, the cylinder shaped lenses 40 extending in y direction are arranged in x direction. In FIG. 31, a pitch of the liquid crystal lens in x direction is p1; the light emitting surface is divided in 9 regions in this case. The pitch p1 of each of the liquid crystal lenses 40 can be set in a dimension easy to form the lens 40. By the way each of the lenses 40 in FIG. 31 is a convex lens; various lenses can be formed by configuration of the electrodes, and directions of applied voltages, namely directions of electric field. In the meantime, in many cases, a pitch p1 of the liquid crystal lens is larger than pitches of the prism array formed on the upper prism sheet 15 or the prism array formed on the lower prism sheet 14.

Figure 32:
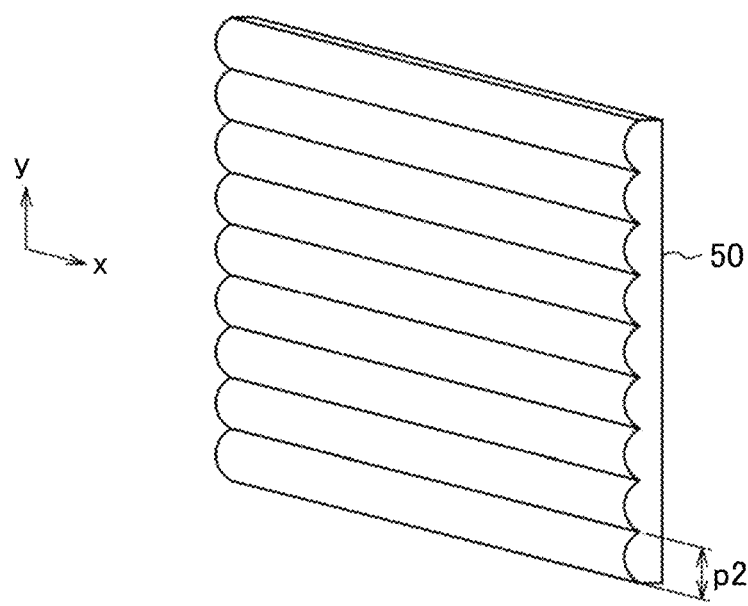
FIG. 32 is a model to show a lens action of the second liquid crystal lens.

FIG. 32 is a model of the upper liquid crystal lens 50. In FIG. 32, the cylinder shaped lenses 50 extending in x direction are arranged in y direction. In FIG. 32, a pitch of the liquid crystal lens 50 in y direction is p2. The function of the liquid crystal lens 50 in FIG. 32 is the same as explained in FIG. 31 except that a converging direction of the lens 50 is perpendicular to a converging direction of the lens 40 of FIG. 31. In the meantime, in many cases, a pitch p2 of the liquid crystal lens is larger than a pitch of the prism array formed on the upper prism sheet 15 or the prism array formed on the lower prism sheet 14. The prism array formed form the cylinder lenses in FIG. 31 or FIG. 32 is formed in one liquid crystal lens.

Figure 33:
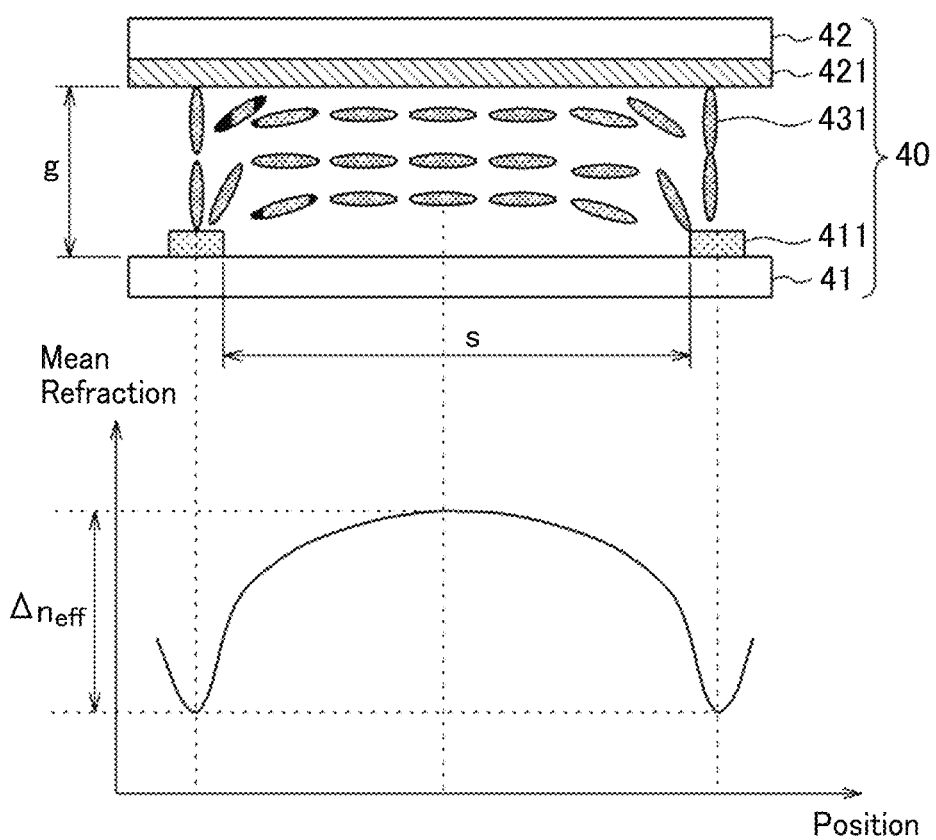
FIG. 33 is a cross sectional view to show a shape of the liquid crystal lens.

A lens pitch p1 or P2 of the liquid crystal lens is often determined by division number in the emitting surface. On the other hand, a range in thickness g of the liquid crystal layer in the liquid crystal lens is often limited. FIG. 33 is alignments of the liquid crystal molecules 431 and a distribution of the refractive index when the space s between the comb electrodes 411 is substantially larger than a thickness g of the liquid crustal layer. In FIG. 33, the vertical axis is a mean refractive index at each of the positions in the liquid crystal lens; Δneff is a difference of the refractive index in the liquid crystal lens. In the lens in FIG. 33, a lens of small radius of curvature is formed near the comb electrode 411, and a lens of large radius of curvature is formed at the intermediate position between the comb electrodes 411.

Figure 34:
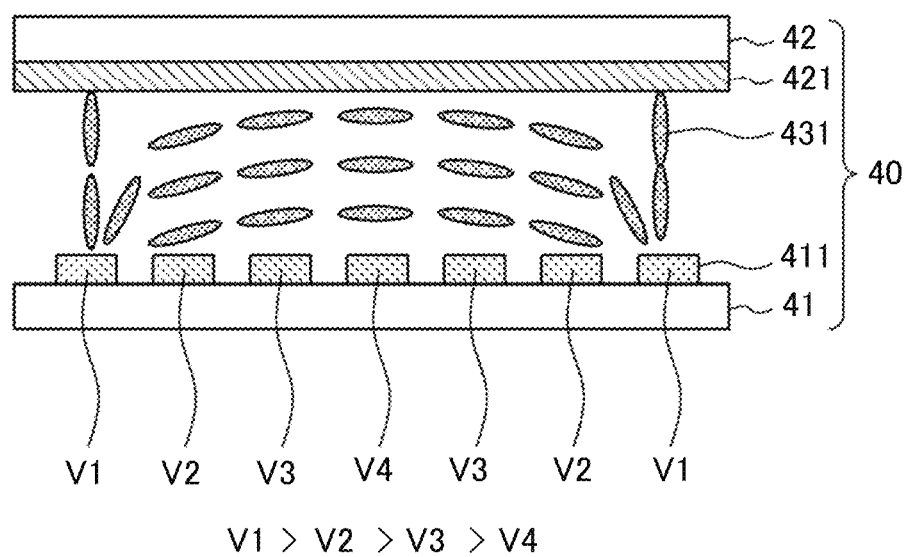
FIG. 34 is a cross sectional view to show a shape of another liquid crystal lens.
Figure 35:
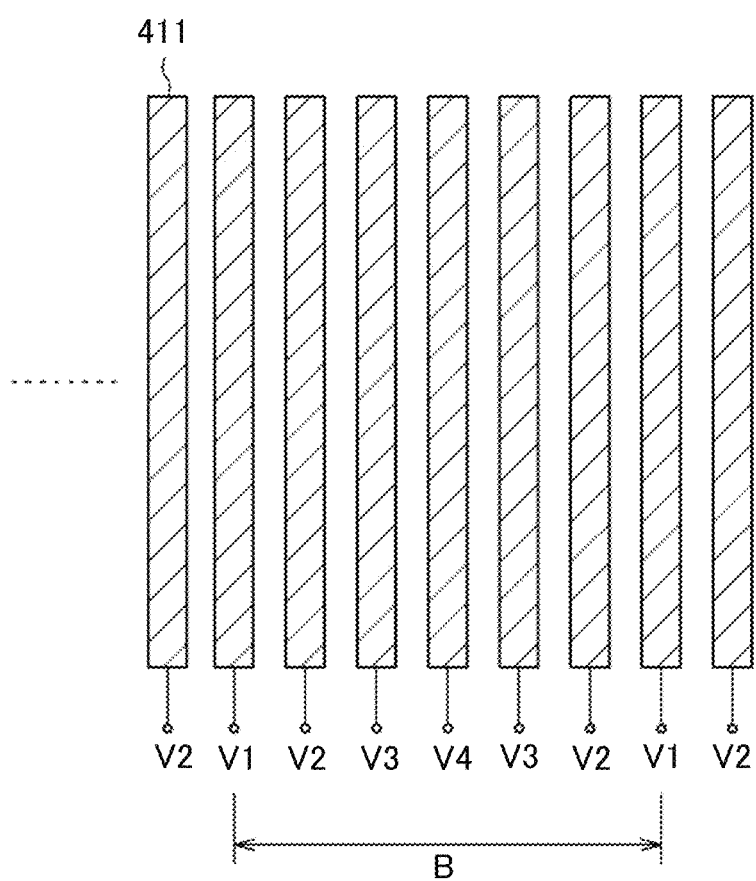
FIG. 35 is a plan view of the first electrodes corresponding to the liquid crystal lens according to FIG. 34.

In some cases, a lens having a curvature shown FIG. 33 may be used; however, in other cases a lens having curvature of quadratic curve is needed. FIG. 34 is a cross sectional view of the liquid crystal lens, in which the lens shape is made in quadratic curve or in smooth curve without changing a pitch of the lens or a thickness of the liquid crystal layer. In FIG. 34, one lens is formed by seven electrodes 411, and a different voltage is applied to each of the electrodes 411 to align the liquid crystal molecules 413 so that refractive index curve becomes a quadratic curve in the liquid crystal lens. In FIG. 34, the voltages are applied as V1>V2>V3>V4. FIG. 35 is a plan view of the comb electrodes 411 corresponding to FIG. 34. For example, the region B in FIG. 35 corresponds to the region B in FIG. 23C.

Figure 36:
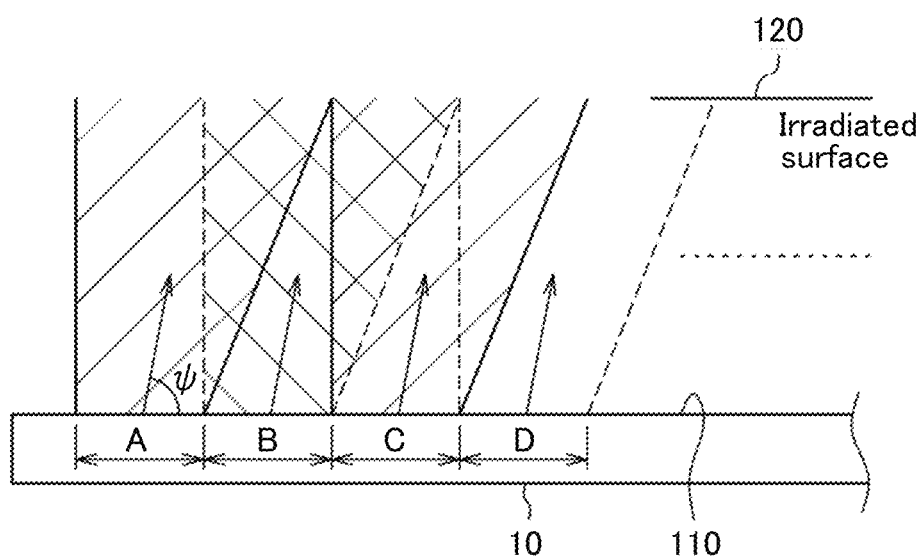
FIG. 36 is a model to show a lens action of the liquid crystal lens.

In some cases, the direction of the light is intended in a certain direction, not normal to the emitting surface 110. FIG. 36 is an example in which the light from each of the regions A, B, C, and the like is emitted in the direction of ψ to the emitting surface 110, not normal to the emitting surface 110. Such function can be attained by shaping each of the liquid crystal lenses asymmetric.

Figure 37:
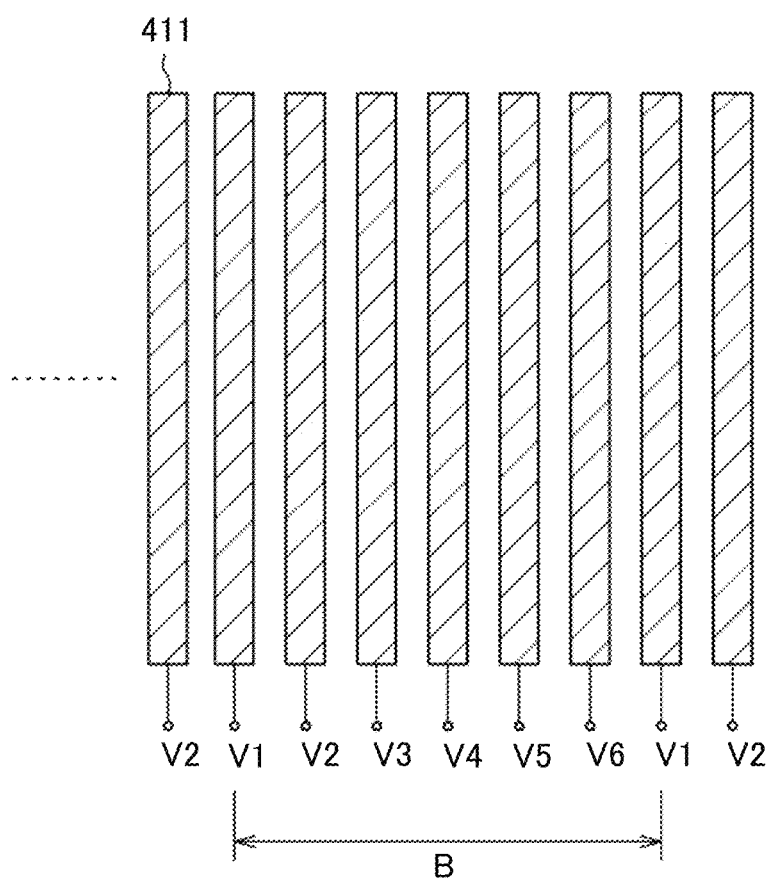
FIG. 37 is an example of voltages applied to the first electrodes to reveal the function of FIG. 36.

FIG. 37 is a plan view of the comb electrodes 411 in which voltages are applied asymmetrically to each of the comb electrodes 411 to make the asymmetric lens. As shown in FIG. 37, the voltages are applied as V1>V2>V3>V4, and V1>V5≠V3, and V1>V6≠V2. As a result, the liquid crystal molecules 431 are aligned to form an asymmetric lens in the cross sectional view of the liquid crystal lens as shown in FIG. 34.

Figure 38A:
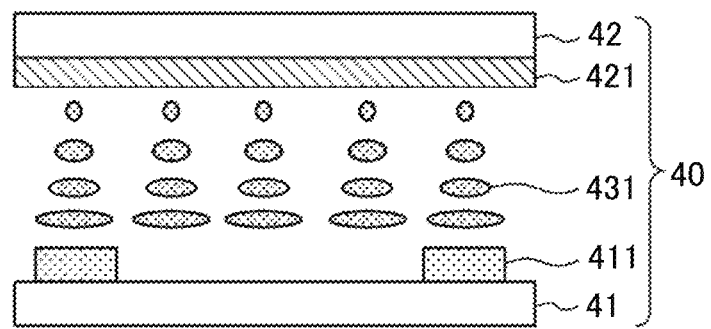
FIG. 38A is a cross sectional view of a lens action of the liquid crystal lens constituted from the TN liquid crystal.
Figure 38B:
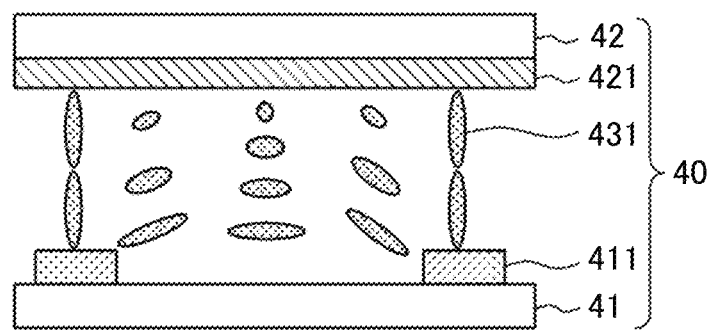
FIG. 38B is another cross sectional view of a lens action of the liquid crystal lens constituted from the TN liquid crystal.

The liquid crystal lens can be realized not only by the homogeneous alignment liquid crystal as shown e.g. in FIG. 27A or 34 but also by various other types of liquid crystal devices. FIGS. 38A and 38B are examples that the liquid crystal lens is formed by TN (Twisted Nematic) type liquid crystal. In the TN type, the liquid crystal molecules 431 rotate their alignment direction in 90 degrees between the first substrate 41 and the second substrate 42.

FIG. 38A is an example in which a voltage is not applied between the first electrode 411 and the second electrode 421. In this case, the liquid crystal molecules 431 are aligned in parallel to the first substrate 41 or the second substrate 42; however, alignment direction of the liquid crystal molecules 431 rotates 90 degrees between a region near the first substrate 41 and a region near the second substrate 42. FIG. 38B is an example in which a voltage is applied between the first electrode 411 and the second electrode 421. In this case, the liquid crystal molecules 431 align in vertical direction to the first substrate 41 at directly above the comb electrode 411, thus, the light is shut. In the intermediate position between the comb electrodes 411, however, the liquid crystal molecules 431 are not influenced by electric field and maintain rotation of 90 degrees with respect to the alignment direction near the first substrate 41; thus, transmittance is not influenced.

When the structure of FIG. 38B is evaluated as a lens, the refractive index is minimum directly above the comb electrode 411 and the refractive index is maximum at the intermediate position between the comb electrodes 411. Therefore, the distributed refractive index type lens GRIN (Gradient Index Lens) is formed. Various shapes of lenses can be realized by configuring the electrodes as in FIG. 34 or FIG. 37 even when the lens is formed by TN type liquid crystal.

Figure 39A:
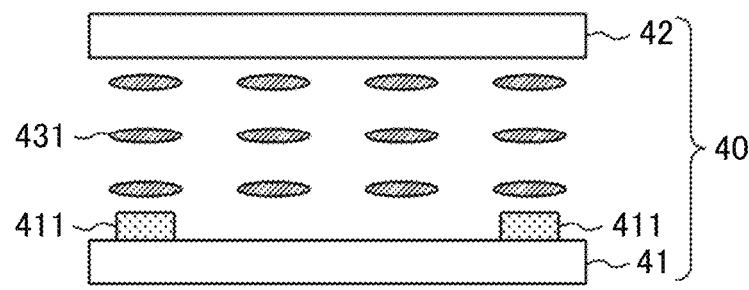
FIG. 39A is a cross sectional view to show a lens action of the liquid crystal lens formed by applying voltages between the comb shaped electrodes.
Figure 39B:
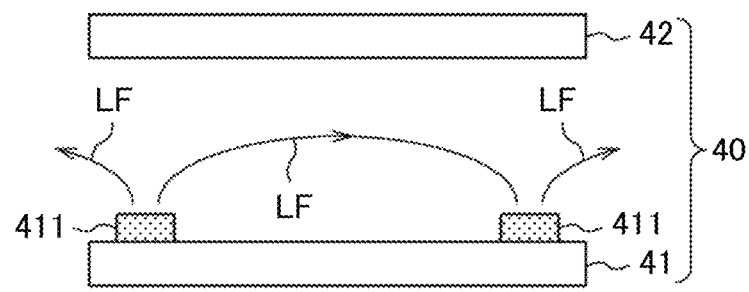
FIG. 39B is another cross sectional view to show a lens action of the liquid crystal lens formed by applying voltages between the comb shaped electrodes.
Figure 39C:
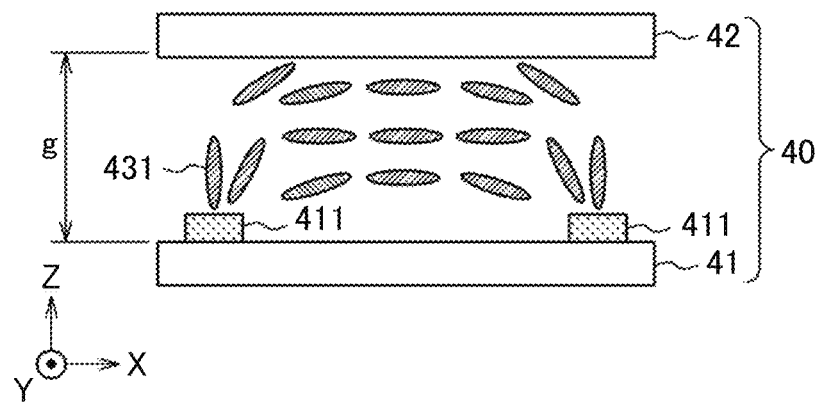
FIG. 39C is yet another cross sectional view to show a lens action of the liquid crystal lens formed by applying voltages between the comb shaped electrodes.

FIGS. 39A to 39C are cross sectional views in which the liquid crystal lens is formed by applying a voltage between the first electrodes 411 of comb shape. In FIG. 39A, the comb electrodes 411 are formed on the first substrate 41. On the other hand, no electrode is formed on the second substrate 42. The liquid crystal lens is constituted by the liquid crystal molecules 431 being aligned by applying a voltage between the comb electrodes 411, thus, the second electrode 421 is not indispensable. The second electrode 421 is formed by a transparent conductive film as ITO (Indium tin Oxide); however, even a transparent conductive film absorbs or reflects light in certain degree, thus, it is profitable from a view of transmittance of the lens that the second electrode 421 does not exist. The second electrode 421 may be formed on the second substrate 42 e.g. if the shape of the lens is intended to be changed.

FIG. 39B shows lines of forces LF generated by applying a voltage between the comb electrodes 411. The lines of forces LF are directed vertically to the substrate 41 at directly above the comb electrode 411; the lines of forces LF are directed in parallel to the substrate 41 at the intermediate position between the comb electrodes 411. The liquid crystal molecules 431 align in the lines of forces LF.

FIG. 39C is a cross sectional view in which the liquid crystal molecules 431 align in the field that is depicted in FIG. 39B. In FIG. 39C, the refractive index is minimum at the region directly above the comb electrode 411 and is maximum at the intermediate position between the comb electrodes 411. Therefore, in this case too, the distributed refractive index type lens GRIN (Gradient Index Lens) is formed.

Figure 40:
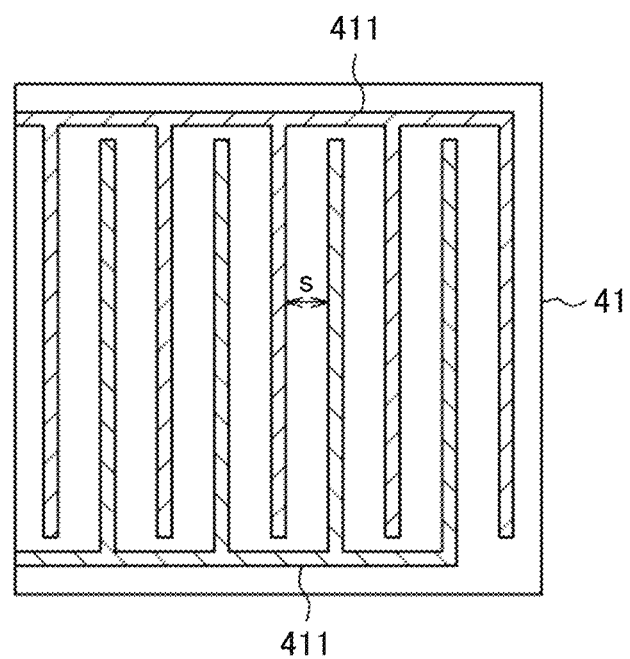
FIG. 40 is a plan view of the first electrode when the liquid crystal lens is constituted by applying voltages between the comb shaped electrodes.

FIG. 40 is a plan view of the first electrode 411 formed on the first substrate 41. In FIG. 40, the first comb electrode 411 and the second comb electrode 411 are nested. The lens depicted in FIG. 39C is formed by applying a voltage between the first comb electrode 411 and the second comb electrode 411. Various liquid crystal lenses can be formed by changing a thickness g of the liquid crystal layer, a distance s between the comb electrodes 411, and a voltage V applied between the comb electrodes 411.

Figure 41:
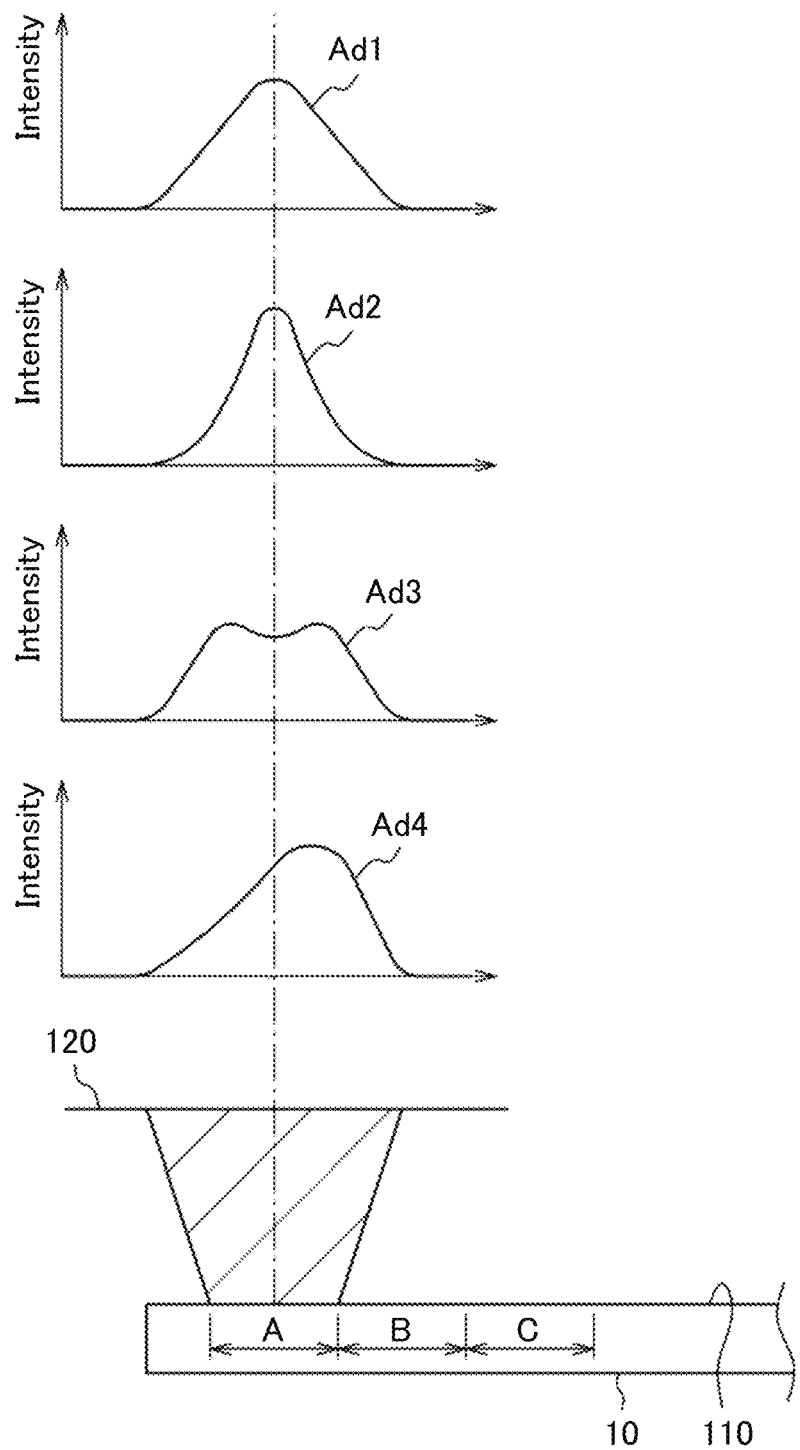
FIG. 41 is a graph to show a lens action by a liquid crystal lens to the illuminous distribution.

As described above, lenses of various functions can be formed not only by changing a distance between the electrodes, a thickness of the liquid crystal layer, and an applied voltage between the electrodes, but also by the types of liquid crystal lenses. FIG. 41 shows examples to change the illuminance distribution by the liquid crystal lens. FIG. 41 is the same structure as FIG. 23B and FIG. 23C, however, only emitting light from the region A is shown. FIG. 41 shows that the distribution of the emitting light can be changed in various shapes by the liquid crystal lens set in the region A.

The illuminance distribution Ad1 resembles to the normal distribution; the illuminance distribution Ad2 also resembles to the normal distribution, however, the light is more condensed. The illuminance distribution Ad3 shows a case where the liquid crystal lens is used as a divergence lens to acquire a trapezoidal illuminance distribution. The illuminance distribution Ad4 shows a case where a direction of the axis of the illuminance distribution is deviated in polar angle by making the liquid crystal lens asymmetric.

As explained in FIGS. 23A to 23C, the illuminance distribution on the screen 120 is a summation of the light emitted from each of the regions of the emitting surface 110. In other words, the illuminance distribution on the irradiating surface 120 can be changed by changing the illuminance distribution from each of the regions, A, B, C, and the like in the emitting surface 110.

The extending directions of the cylindrical lenses shown as a model in FIGS. 31 and 32 may be preferably tilted against the extending directions of the prism arrays formed on the top surface and the bottom surface of the light guide 13, the lower prism sheet 14 and the upper prism sheet 15 to avoid moire. The tilting angle in this case is e.g. 5 to 15 degrees. In addition, it is preferable to tilt the extending direction in e.g. 5 to 15 degrees between each of the prism arrays formed on the top and bottom surfaces of the light guide 13, the lower prism sheet 14 and the upper prism sheet 15 to avoid moire.

What is claimed is:

1. A lighting device comprising:
   a light guide,
   a reflecting sheet disposed under the light guide, and
   a first prism sheet disposed over the light guide,
   wherein, a first white LED, a second white LED and a third white LED are disposed in a same interval on a first side surface and on a second side surface, which opposes to the first side surface,
   a first prism array extending in an orthogonal direction to the first side surface and arranged in a parallel direction with the first side surface is formed on a major surface of the light guide,
   a second prism array extending in a parallel direction with the first side surface and arranged in an orthogonal direction to the first side surface is formed on a back surface of the light guide,
   the reflecting sheet is disposed under the back surface of the light guide,
   the first prism sheet is disposed on the major surface of the light guide,
   a third prism array, extending in a parallel direction with the first side surface of the first light guide and arranged in orthogonal direction to the side surface of the first light guide is formed on a first surface of the first prism sheet opposing to the light guide,
   a second prism sheet is disposed on the first prism sheet,
   a fourth prism array extending in an orthogonal direction to the first side surface and arranged in a parallel direction with the first side surface is formed on a second surface opposing to the light guide, and
   a first pitch of the first prism array and a second pitch of the second prism array are smaller than a third pitch of the third prism array and a fourth pitch of the fourth prism array.

2. The lighting device according to claim 1,
   wherein a color temperature of the first white LED is approximately 5000 K, a color temperature of the second white LED is approximately 3500 K, and a color temperature of the third white LED is approximately 2800 K.

3. The lighting device according to claim 1,
   wherein a first height of the first prism array and a second height of the second prism array are smaller than a third height of the third prism array and a fourth height of the fourth prism array.

4. The lighting device according to claim 1,
   wherein a first pitch of the first prism array and a second pitch of the second prism array are smaller in two digits order than a third pitch of the third prism array and a fourth pitch of the fourth prism array.

5. The lighting device according to claim 1,
   wherein a first height of the first prism array and a second height of the second prism array are smaller in two digits order than a third height of the third prism array and a fourth height of the fourth prism array.

6. The lighting device according to claim 1,
   wherein a plurality of first liquid crystal lenses extending in a first direction and arranged in a second direction are disposed on the first prism sheet.

7. The lighting device according to claim 6,
   wherein a plurality of liquid crystal lenses extending in the second direction and arranged in the first direction are disposed above the first liquid crystal lens.

8. The lighting device according to claim 1,
   wherein a plurality of second liquid crystal lenses extending in a first direction and arranged in a second direction are disposed on the second prism sheet.

9. A lighting device comprising:
   a light guide,
   a reflecting sheet disposed under the light guide, and
   a first prism sheet disposed over the light guide,
   wherein, a first white LEDs are disposed in a same interval on a first side surface of the light guide, and a second white LEDs are disposed in a same interval on a second side surface, which opposes to the first side surface,
   a first prism array extending in an orthogonal direction to the first side surface and arranged in a parallel direction with the first side surface is formed on a major surface of the light guide,
   a second prism array extending in a parallel direction with the first side surface and arranged in an orthogonal direction to the first side surface is formed on a back surface of the light guide,
   the reflecting sheet is disposed under the back surface of the light guide,
   the first prism sheet is disposed on the major surface of the light guide,
   a third prism array, extending in a parallel direction with the first side surface of the first light guide and arranged in orthogonal direction to the side surface of the first light guide is formed on a first surface of the first prism sheet opposing to the light guide,
   a second prism sheet is disposed on the first prism sheet,
   a fourth prism array extending in an orthogonal direction to the first side surface and arranged in a parallel direction with the first side surface is formed on a second surface opposing to the light guide, and
   a first pitch of the first prism array and a second pitch of the second prism array are smaller than a third pitch of the third prism array and a fourth pitch of the fourth prism array.

10. The lighting device according to claim 9,
    wherein a first white LEDs is either one of the white LEDs of a color temperature of approximately 5000 K, a color temperature of approximately 3500 K, and a color temperature of approximately 3500 K, and a second white LEDs is either one of the white LEDs of a color temperature of approximately 5000 K, a color temperature of approximately 3500 K, and a color temperature of approximately 3500 K.

11. The lighting device according to claim 9, wherein a first height of the first prism array and a second height of the second prism array are smaller than a third height of the third prism array and a fourth height of the fourth prism array.

12. The lighting device according to claim 9, wherein a first pitch of the first prism array and a second pitch of the second prism array are smaller in two digits order than a third pitch of the third prism array and a fourth pitch of the fourth prism array.

13. The lighting device according to claim 9, wherein a first height of the first prism array and a second height of the second prism array are smaller in two digits order than a third height of the third prism array and a fourth height of the fourth prism array.

14. The lighting device according to claim 9, wherein a plurality of first liquid crystal lenses extending in a first direction and arranged in a second direction are disposed on the first prism sheet.

15. The lighting device according to claim 14, wherein a plurality of liquid crystal lenses extending in the second direction and arranged in the first direction are disposed above the first liquid crystal lens.

16. The lighting device according to claim 9, wherein a plurality of liquid crystal lenses extending in a first direction and arranged in a second direction are disposed on the second prism sheet.

* * * * *